United States Patent
Allen

(10) Patent No.: US 9,738,760 B2
(45) Date of Patent: Aug. 22, 2017

(54) ALIPHATIC POLYCARBONATE COMPOSITIONS AND METHODS

(71) Applicant: Novomer, Inc., Ithaca, NY (US)

(72) Inventor: Scott D. Allen, Ithaca, NY (US)

(73) Assignee: Novomer, Inc., Waltham, MA (US)

( * ) Notice: Subject to any disclaimer, the term of this patent is extended or adjusted under 35 U.S.C. 154(b) by 0 days.

(21) Appl. No.: 14/888,409

(22) PCT Filed: Mar. 31, 2014

(86) PCT No.: PCT/US2014/032340
§ 371 (c)(1),
(2) Date: Oct. 30, 2015

(87) PCT Pub. No.: WO2014/178972
PCT Pub. Date: Nov. 6, 2014

(65) Prior Publication Data
US 2016/0068638 A1  Mar. 10, 2016

Related U.S. Application Data

(60) Provisional application No. 61/817,897, filed on May 1, 2013.

(51) Int. Cl.
| | |
|---|---|
| C08G 81/02 | (2006.01) |
| C08L 69/00 | (2006.01) |
| C08L 63/10 | (2006.01) |
| C08G 64/02 | (2006.01) |
| C08G 64/34 | (2006.01) |

(52) U.S. Cl.
CPC ....... *C08G 81/027* (2013.01); *C08G 64/0216* (2013.01); *C08G 64/34* (2013.01); *C08L 63/10* (2013.01); *C08L 69/00* (2013.01)

(58) Field of Classification Search
None
See application file for complete search history.

(56) References Cited

U.S. PATENT DOCUMENTS

| | | | |
|---|---|---|---|
| 4,066,630 A | 1/1978 | Dixon et al. | |
| 4,415,502 A * | 11/1983 | Timberlake | C08G 64/0208 510/506 |
| 6,100,372 A | 8/2000 | Kim et al. | |
| 7,858,729 B2 | 12/2010 | Allen | |
| 8,247,520 B2 | 8/2012 | Allen et al. | |
| 8,470,956 B2 | 6/2013 | Allen et al. | |
| 8,575,245 B2 | 11/2013 | LaPointe et al. | |
| 8,580,911 B2 | 11/2013 | Allen et al. | |
| 8,604,155 B2 | 12/2013 | Allen et al. | |
| 8,748,555 B2 | 6/2014 | Allen | |
| 8,785,591 B2 | 7/2014 | Allen et al. | |
| 8,921,508 B2 | 12/2014 | Allen et al. | |
| 9,029,498 B2 | 5/2015 | Allen et al. | |
| 9,102,800 B2 | 8/2015 | Allen et al. | |
| 2011/0218127 A1 | 9/2011 | Allen et al. | |
| 2011/0230580 A1 | 9/2011 | Allen et al. | |
| 2011/0257296 A1 | 10/2011 | LaPointe et al. | |
| 2012/0156410 A1 | 6/2012 | Allen | |
| 2013/0066044 A1 | 3/2013 | Allen et al. | |
| 2013/0244864 A1 | 9/2013 | Allen et al. | |
| 2013/0303724 A1 | 11/2013 | Allen et al. | |
| 2014/0031453 A1 | 1/2014 | Allen et al. | |
| 2014/0046008 A1 | 2/2014 | Allen et al. | |
| 2014/0296522 A1 | 10/2014 | Lee et al. | |
| 2015/0152221 A1 | 6/2015 | Farmer | |
| 2015/0166734 A1 | 6/2015 | Allen et al. | |
| 2015/0299386 A1 | 10/2015 | Allen et al. | |
| 2015/0307660 A1 | 10/2015 | Allen et al. | |

FOREIGN PATENT DOCUMENTS

| | | |
|---|---|---|
| WO | WO-2010/028362 A1 | 3/2010 |
| WO | WO-2010/062703 A1 | 6/2010 |
| WO | WO-2010/075232 A1 | 7/2010 |
| WO | WO-2011/163133 A1 | 12/2011 |
| WO | WO-2012/027725 A1 | 3/2012 |
| WO | WO-2012/069523 A1 | 5/2012 |
| WO | WO-2012/071505 A1 | 5/2012 |
| WO | WO-2012/154849 A1 | 11/2012 |
| WO | WO-2013/177546 A2 | 11/2013 |
| WO | WO-2015/154001 A1 | 10/2015 |

OTHER PUBLICATIONS

Han, C.J. et al., Synthesis of Hydroxy-Terminated Polyethylene via Controlled Chain Transfer Reaction and Poly(ethylene-b-caprolactone) Block Copolymer, Macromolecules, 35: 8923-8925 (2002).
International Search Report for PCT/US2014/032340, 5 pages (Oct. 17, 2014).

\* cited by examiner

*Primary Examiner* — Jeffrey Mullis
(74) *Attorney, Agent, or Firm* — John G. Tolomei

(57) ABSTRACT

In one aspect, the present invention pertains to novel block materials comprising an aliphatic polycarbonate (APC) chain bound to a hydrocarbon. The invention also provides methods of making the block materials and using them as compatibilizers for polymer blends. In another aspect, the present invention encompasses methods of making blends of APCs with polyolefins. In certain embodiments, the methods comprise the step of blending one or more APCs with one or more polyolefins in the presence of a compatibilizer as described herein. In another aspect, the present invention encompasses novel blends of APCs with polyolefins. In certain embodiments, the blends comprise one or more APCs; at least one polyolefin and a compatibilizer as described herein.

4 Claims, No Drawings

ALIPHATIC POLYCARBONATE COMPOSITIONS AND METHODS

CROSS REFERENCE TO RELATED APPLICATIONS

The present invention claims priority to U.S. provisional patent application No. 61/817,897, filed May 1, 2013, the entire contents of which are hereby incorporated by reference.

FIELD OF THE INVENTION

This invention pertains to compatibilizers for blending aliphatic polycarbonates with polyolefins. The compatibilizers comprise block polymers containing a hydrocarbon segment and an aliphatic polycarbonate segment.

BACKGROUND OF THE INVENTION

Aliphatic polycarbonates (APCs) derived from the copolymerization of carbon dioxide and epoxides are emerging as promising green polymers. The incorporation of $CO_2$ which accounts for up to 50% of the polymer mass has environmental advantages versus traditional polymers derived solely from petrochemical feedstocks.

The $CO_2$ based polymers have good gas barrier properties and therefore there is interest in using them in packaging applications where oxygen barrier properties are prized. Despite this interest, it is very difficult to use a new polymer as a drop-in replacement for existing commodity polymer since mismatches in physical properties or polymer processing parameters, cannot be tolerated. Therefore, there is particular interest in blends of APCs with existing commodity polymers. Such blends can benefit from the improved gas barrier properties of APCs while allowing use of existing processing equipment. One high value application for APCs is in blends with polyolefins such as polyethylene and polypropylene. The blended materials have improved oxygen barrier properties relative to polyolefins alone and process similarly to the neat polyolefins. Nevertheless, it can be a challenge to produce APC polyolefins blends since the two materials are not always compatible. Therefore, there remains a need for effective compatibilizers for APCs and polyolefins.

SUMMARY OF THE INVENTION

Among other things, the present invention encompasses the recognition that block copolymers comprising a hydrocarbon block and an aliphatic polycarbonate block are effective as additives to compatibilize blends of APCs with polyolefins.

In another aspect, the present invention encompasses novel block copolymers with utility as compatibilizers for APC-polyolefin blends. In certain embodiments, the novel block copolymers have a formula I:

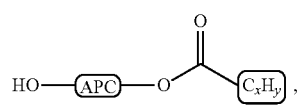

where the moiety

comprises an alternating copolymer of $CO_2$ and one or more epoxides; and
the moiety

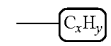

comprises a saturated or unsaturated hydrocarbon.

In another aspect, the present invention encompasses methods of making blends of APCs with polyolefins. In certain embodiments, the methods comprise the step of blending one or more APCs with one or more polyolefins in the presence of a compatibilizer of formula I.

In another aspect, the present invention encompasses novel blends of APCs with polyolefins. In certain embodiments, the blends comprise one or more APCs; at least one polyolefin and a compatibilizer of formula I.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3rd Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound or polymer is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, Ind. 1972).

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units or polymer blocks separated by a slash may be used herein:

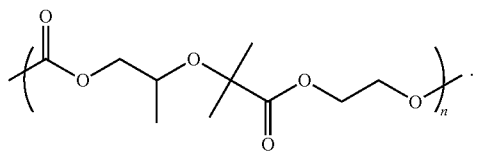

These structures are to be interpreted to encompass copolymers incorporating any ratio of the different monomer units depicted unless otherwise specified. This depiction is also meant to represent random, tapered, block co-polymers, and combinations of any two or more of these and all of these are implied unless otherwise specified.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-80 carbon atoms. In certain embodiments, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

As used herein, the term "bivalent $C_{1-8}$ (or $C_{1-3}$) saturated or unsaturated, straight or branched, hydrocarbon chain", refers to bivalent alkyl, alkenyl, and alkynyl, chains that are straight or branched as defined herein.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 7-membered carbocycle" refers to a 3- to 7-membered saturated or partially unsaturated monocyclic carbocyclic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms.

In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —(CH$_2$)$_{0-4}$R°; —(CH$_2$)$_{0-4}$OR°; —O—(CH$_2$)$_{0-4}$C(O)OR°; —(CH$_2$)$_{0-4}$CH(OR°)$_2$; —(CH$_2$)$_{0-4}$SR°; —(CH$_2$)$_{0-4}$Ph, which may be substituted with R°; —(CH$_2$)$_{0-4}$O(CH$_2$)$_{0-1}$Ph which may be substituted with R°; —CH=CHPh, which may be substituted with R°; —NO$_2$; —CN; —N$_3$; —(CH$_2$)$_{0-4}$N(R°)$_2$; —(CH$_2$)$_{0-4}$N(R°)C(O)R°; —N(R°)C(S)R°; —(CH$_2$)$_{0-4}$N(R°)C(O)NR°$_2$; —N(R°)C(S)NR°$_2$; —(CH$_2$)$_{0-4}$N(R°)C(O)OR°; —N(R°)N(R°)C(O)R°; —N(R°)N(R°)C(O)NR°$_2$; —N(R°)N(R°)C(O)OR°; —(CH$_2$)$_{0-4}$C(O)R°; —C(S)R°; —(CH$_2$)$_{0-4}$C(O)OR°; —(CH$_2$)$_{0-4}$C(O)N(R°)$_2$; —(CH$_2$)$_{0-4}$C(O)SR°; —(CH$_2$)$_{0-4}$C(O)OSiR°$_3$; —(CH$_2$)$_{0-4}$OC(O)R°; —OC(O)(CH$_2$)$_{0-4}$SR°, SC(S)SR°; —(CH$_2$)$_{0-4}$SC(O)R°; —(CH$_2$)$_{0-4}$C(O)NR°$_2$; —C(S)NR°$_2$; —C(S)SR°; —SC(S)SR°, —(CH$_2$)$_{0-4}$OC(O)NR°$_2$; —C(O)N(OR°)R°; —C(O)C(O)R°; —C(O)CH$_2$C(O)R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$; —(CH$_2$)$_{0-4}$S(O)R°; —N(R°)S(O)$_2$NR°$_2$; —N(R°)S(O)$_2$R°; —N(OR°)R°; —C(NH)NR°$_2$; —P(O)$_2$R°; —P(O)R°$_2$; —OP(O)R°$_2$; —OP(O)(OR°)$_2$; SiR°$_3$; —(C$_{1-4}$ straight or branched alkylene)O—N(R°)$_2$; or —(C$_{1-4}$ straight or branched alkylene)C(O)O—N(R°)$_2$, wherein each R° may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-4}$C(O)N(R°)$_2$; —(CH$_2$)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet$$_2$, —NO$_2$, —SiR$^\bullet$$_3$, —OSiR$^\bullet$$_3$, —C(O)SR$^\bullet$, —(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =NNR$^\times$$_2$, =NNHC(O)R$^\times$, =NNHC(O)OR$^\times$, =NNHS(O)$_2$R$^\times$, =NR$^\times$, =NOR$^\times$, —O(C(R$^\times$$_2$))$_{2-3}$O—, or —S(C(R$^\times$$_2$))$_{2-3}$S—, wherein each independent occurrence of R$^\times$ is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR$^\times$$_2$)$_{2-3}$O—, wherein each independent occurrence of R$^\times$ is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R$^\times$ include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger$$_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger$$_2$, —C(S)NR$^\dagger$$_2$, —C(NH)NR$^\dagger$$_2$, or —N(R†)S(O)₂R†; wherein each R† is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R†, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R† are independently halogen, —R●, -(haloR●), —OH, —OR†, —O(haloR†), —CN, —C(O)OH, —C(O)OR†, —NH₂, —NHR†, —NR†₂, or —NO₂, wherein each R† is unsubstituted or where preceded by "halo" is substituted only with one or more halogens, and is independently $C_{1-4}$ aliphatic, —CH₂Ph, —O(CH₂)₀₋₁Ph, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the "term head-to-tail" or "HT", refers to the regiochemistry of adjacent repeating units in a polymer chain. For example, in the context of poly(propylene carbonate) (PPC), the term head-to-tail is based on the three regiochemical possibilities depicted below:

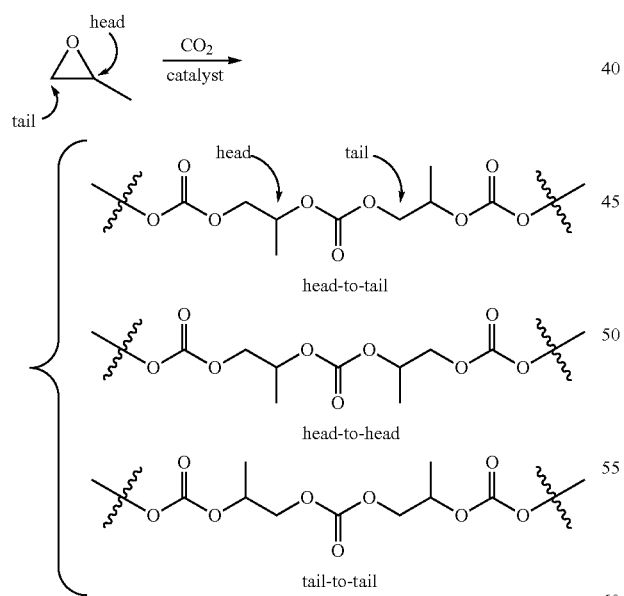

The term head-to-tail ratio (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides.

Unless otherwise specified, "a," "an," "the," and "at least one" are used interchangeably and mean one or more than one.

DETAILED DESCRIPTION OF CERTAIN EMBODIMENTS

I. Novel Block Copolymer Compositions

The present invention provides, among other things, novel block polymers. In certain embodiments, such block polymers have utility as compatibilizers for polymer blends. In certain embodiments, the novel block polymers comprise linear diblock materials where a first block comprises an alternating copolymer of $CO_2$ and one or more epoxides and a second block comprises a hydrocarbon.

In certain embodiments, the novel block copolymers have a formula I:

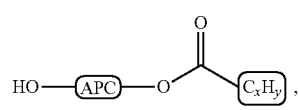

where the moiety

comprises an alternating copolymer of one or more epoxides and $CO_2$; and
the moiety

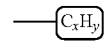

comprises a saturated or unsaturated hydrocarbon.

a. Detailed Description of the APC Segment
In certain embodiments, the moiety

comprises repeating units having a structure:

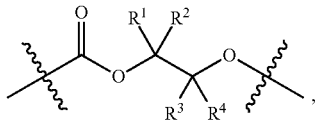

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

In certain embodiments, the moiety

is derived from copolymerization of carbon dioxide with ethylene oxide, propylene oxide, 1,2 butene oxide, 1,2 hexene oxide, oxides of higher alpha olefins (e.g. $C_{6-40}$ alpha olefins), butadiene monoepoxide, epichlorohydrin, ethers or esters of glycidol, cyclopentene oxide, cyclohexene oxide, 3 vinyl cyclohexene oxide, 3-ethyl cyclohexene oxide, or combinations of any two or more of these.

In certain embodiments, the moiety

is derived from propylene oxide. In certain embodiments, the moiety

is derived from propylene oxide and one or more additional epoxides. In certain embodiments, the moiety

is derived from ethylene oxide. In certain embodiments, the moiety

is derived from ethylene oxide and one or more additional epoxides.

In certain embodiments, in copolymers of formula 1, the copolymer has a formula P1:

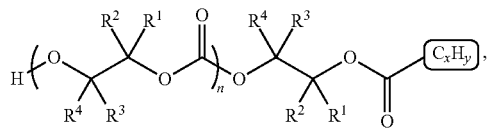

P1 where each of $R^1$, $R^2$, $R^3$, $R^4$, n, and

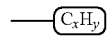

are as defined above and in the classes and subclasses herein, and n is an integer from about 4 to about 5,000.

In certain embodiments, the copolymer has a formula P1a:

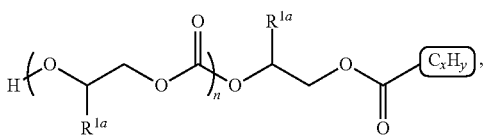

P1a where each of n and

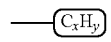

are as defined above and in the classes and subclasses herein; and $R^{1a}$ is, independently at each occurrence in the polymer chain, selected from the group consisting of —H, —CH$_3$, —CH$_2$CH$_3$, —CH$_2$Cl, —CH$_2$OR$^x$, —CH$_2$OC(O)R$^x$, and —(CH$_2$)$_q$CH$_3$, where each R$^x$ is independently an optionally substituted moiety selected from the group consisting of $C_{1-20}$ aliphatic, $C_{1-20}$ heteroaliphatic, 3- to 14-membered carbocyclic, 6- to 10-membered aryl, 5- to 10-membered heteroaryl, and 3- to 12-membered heterocyclic, and q is an integer from 2 to 40.

In certain embodiments, where copolymers of the present invention have a formula P1a, $R^{1a}$ is —H. In certain embodiments, $R^{1a}$ is —CH$_3$. In certain embodiments, $R^{1a}$ is —CH$_2$CH$_3$. In certain embodiments, $R^{1a}$ is a mixture of —H and —CH$_3$. In certain embodiments, $R^{1a}$ is a mixture of H and —CH$_2$CH$_3$. In certain embodiments, $R^{1a}$ is a mixture of H and —CH$_2$Cl. In certain embodiments, $R^{1a}$ is a mixture of —CH$_3$ and —CH$_2$CH$_3$. In certain embodiments, $R^{1a}$ is a mixture of —CH$_3$ and —CH$_2$Cl. It will be appreciated that such "mixtures" of $R^{1a}$ or other substituents refers to cases where for multiple occurrences of the substituent across the polymer, each individual occurrence is selected from one of the specified groups, e.g., hydrogen or —CH$_3$.

In certain embodiments for compositions of formulae P1 or P1a, n is an integer from 4 to about 4,000. Compositions of the present invention can be regarded as belonging to several distinct categories based on the size of the APC ("aliphatic polycarbonate") segment. In certain embodiments, the APC segment has a relatively low number of repeat units (e.g. the APC chains have an average of about 4 to about 50 repeat units) hereinafter denoted Category 1. A second category of compositions contain high molecular weight APC segments (e.g. those having more than about 400 repeat units) denoted hereinafter as Category 2. A third category encompasses the intermediate materials where the APC segment has between about 50 and about 400 repeat units, and hereinafter referred to as Category 3. For example, for poly(propylene carbonate)-based compositions, materials of Category 1 having a value of n between about 4 and 50 have APC segments with molecular weights ranging from about 400 to about 5,000 g/mol since the PPC repeat unit has a molecular weight of 102 g/mol. Similar materials belonging to Category 2 contain PPC chains with molecular weights above about 40,000 g/mol, and those in Category 3 contain PPC chains with molecular weights between about 5,000 and about 40,000 g/mol. As discussed in more detail below, each category of materials has advantages for particular applications.

In certain embodiments, compositions of formulae P1, or P1a are further characterized by how highly alternating the APC chains are. During copolymerization of epoxides with $CO_2$ certain catalysts and conditions lead to the sequential incorporation of two or more epoxides without an interceding carbon dioxide molecule. This produces ether linkages in the polymer chain. There exists a continuum from pure polycarbonates with perfectly alternating structures through polyether-polycarbonates containing proportions of ether and carbonate linkages to pure polyethers where no $CO_2$ is incorporated.

In certain embodiments, compositions of the present invention contain highly alternating APC segments. In certain embodiments, such compositions comprise APC chains containing greater than 90% carbonate linkages and less than 10% ether linkages. In certain embodiments, such compositions comprise APC chains containing greater than 92%, greater than 93%, greater than 94%, greater than 95%, greater than 96%, greater than 97%, greater than 98%, greater than 99%, or greater than 99.5% carbonate linkages. In certain embodiments, the compositions comprise APC chains with no detectable ether linkages (e.g. as determined by $^1H$ or $^{13}C$ NMR spectroscopy).

In certain embodiments, compositions of the present invention contain APC segments containing ether linkages. In certain embodiments, such compositions comprise APC chains containing between about 40% and about 90% carbonate linkages with the balance comprising ether linkages. In certain embodiments, such compositions comprise APC chains containing between about 50% and about 90% carbonate linkages, between about 50% and about 80% carbonate linkages carbonate linkages, between about 60% and about 80% carbonate linkages, between about 40% and about 60% carbonate linkages, or between about 80% and about 90% carbonate linkages.

In certain embodiments, compositions of formulae I, P1, and P1a, are further characterized by the distribution of APC chain lengths in the composition. This distribution of chain lengths (and therefore molecular weight) can be assessed by measurement of the polydispersity index (PDI) of the composition. In certain embodiments, compositions of the present invention contain APC segments with a narrow molecular weight distribution. In certain embodiments, the PDI of the composition is less than about 2. In certain embodiments, the PDI is less than about 1.6, less than about 1.4, less than about 1.3, less than about 1.2, or less than about 1.1.

In certain instances, it may be desirable to have a relatively broad PDI. This can be controlled using known methods including those described in co-owned U.S. Pat. No. 7,858,729. Therefore, in certain embodiments, compositions of the present invention contain APC segments with a relatively broad molecular weight distribution. In certain embodiments, the PDI is between about 2 and about 8. In certain embodiments, the PDI is between about 2 and about 5, between about 2 and about 4, between about 2 and about 3, or between about 3 and about 5.

b. Detailed Description of the Hydrocarbon Segment

In its broadest embodiment, the moiety

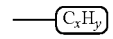

comprises a saturated or unsaturated hydrocarbon. Compositions of the present invention contain hydrocarbon segments

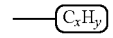

that can be regarded as falling into two categories: a first category (hereinafter Category A) comprises polymeric materials such as polyolefins which have a relatively large size (for example those containing more than about 80 and up to many thousands of carbon atoms); a second category (hereinafter Category B) contains smaller hydrocarbon moieties spanning the range from about 4 carbon atoms up to the lower range of category A. In certain embodiments, for materials either category A or B, the moiety

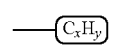

is saturated, while in other embodiments, the moiety

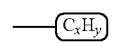

is partially unsaturated. In certain embodiments, for materials either category, the moiety

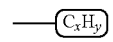

further comprises one or more aromatic groups.

Turning first to Category A where the moiety

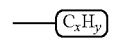

comprises a polymeric material, certain embodiments of the present invention encompass materials having a polyefin segment linked to an APC moiety. Suitable polyolefins include polyethylene (PE), polypropylene (PP), polyisobutylene (PIB), polymethylpentene (PMP), polybutene-1 (PB-1), as well as copolymers of any of these with each other or with other olefins such as butadiene, higher alpha olefins, styrene, and the like.

In certain embodiments, for materials of formulae I and P1, and P1a, the moiety

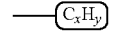

comprises polyethylene. In certain embodiments, the moiety

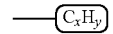

comprises a polyethylene moiety having between about 80 and about 500 carbon atoms. In certain embodiments, the moiety

comprises a polyethylene moiety having between about 500 and about 2,500 carbon atoms. In certain embodiments, the moiety

comprises a polyethylene moiety having between about 2,500 and about 10,000 carbon atoms. In certain embodiments, the moiety

comprises a polyethylene moiety having between about 10,000 and about 50,000 carbon atoms. In certain embodiments, the moiety

comprises a polyethylene moiety having between about 50,000 and about 100,000 carbon atoms. In certain embodiments, such polyethylene moieties are linear. In certain embodiments, such polyethylene moieties contain long chain branching. In certain embodiments, such polyethylene moieties contain branches introduced by copolymerization of ethylene with alpha olefins.

In certain embodiments, for materials of formulae I, P1, and P1a, the moiety

comprises polypropylene. In certain embodiments, the moiety

comprises a polypropylene moiety having between about 80 and about 500 carbon atoms. In certain embodiments, the moiety

comprises a polypropylene moiety having between about 500 and about 2,500 carbon atoms. In certain embodiments, the moiety

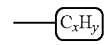

comprises a polypropylene moiety having between about 2,500 and about 10,000 carbon atoms. In certain embodiments, the moiety

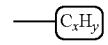

comprises a polypropylene moiety having between about 10,000 and about 50,000 carbon atoms. In certain embodiments, the moiety

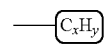

comprises a polypropylene moiety having between about 50,000 and about 100,000 carbon atoms. In certain embodiments, such polypropylene moieties are linear. In certain embodiments, such polypropylene moieties contain long chain branching. In certain embodiments, such polypropylene moieties contain branches introduced by copolymerization of propylene with higher alpha olefins. In certain embodiments, such polypropylene moieties are isotactic. In certain embodiments, such polypropylene moieties are syndiotactic. In other embodiments, such polypropylene moieties are atactic.

In certain embodiments, for materials of formulae I and P1, and P1a, the moiety

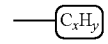

comprises polypropylene. In certain embodiments, the moiety

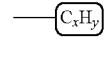

comprises a polyisobutylene moiety having between about 80 and about 500 carbon atoms. In certain embodiments, the moiety $$—[C_xH_y]$$

comprises a polyisobutylene moiety having between about 500 and about 2,500 carbon atoms, the moiety $$—[C_xH_y]$$

comprises a polyisobutylene moiety having between about 2,500 and about 10,000 carbon atoms. In certain embodiments, the moiety

comprises a polyisobutylene moiety having between about 10,000 and about 50,000 carbon atoms.

Of particular utility are

derived from polyolefins containing a substituent such as a hydroxyl or carboxyl group since these provide a means of attaching the APC moiety to the polyolefin (i.e. using methods described more fully below). Suitable methods are known in the art for the manufacture of polyethylene and other polyolefins with a hydroxyl or carboxyl group at one chain terminus. For example, manufacture of hydroxyl-terminated polyethylene is described in Macromolecules 2002, 35, 8923-8925 which is incorporated herein by reference.

As noted above, a second category of materials encompassed by the present invention comprise compositions having an APC moiety bound to a hydrocarbon having between about 4 and about 80 carbon atoms (Category B). In certain embodiments, for materials of formulae I, P1, and P1a, the moiety

comprises a $C_4$ to $C_{80}$ aliphatic group. In certain embodiments, for materials of formulae I, P1, and P1a, the moiety

comprises a saturated $C_4$ to $C_{80}$ aliphatic group. In certain embodiments, for materials of formulae I, P1, and P1a, the moiety

comprises an unsaturated saturated $C_4$ to $C_{80}$ aliphatic group. In certain embodiments, for materials of formulae I, P1, and P1a, the moiety

comprises a straight-chain $C_4$ to $C_{80}$ aliphatic group. In certain embodiments, for materials of formulae I, P1, and P1a, the moiety

comprises a branched-chain $C_4$ to $C_{80}$ aliphatic group.

In embodiments, for compounds of formulae I, P1, and P1a,

comprises a straight-chain aliphatic group. In certain embodiments, such aliphatic groups comprise 6 to 80 carbon atoms. In certain embodiments,

comprises a $C_{7-12}$ straight-chain aliphatic group. In certain embodiments,

comprises a $C_{12-16}$ straight-chain aliphatic group. In certain embodiments,

comprises a $C_{16-20}$ straight-chain aliphatic group. In certain embodiments,

comprises a $C_{20-24}$ straight-chain aliphatic group, a $C_{24-28}$ straight-chain aliphatic group, a $C_{28-36}$ straight-chain aliphatic group, or a $C_{36-40}$ straight-chain aliphatic group. In certain embodiments,

comprises a $C_{40-60}$ straight-chain aliphatic group or a $C_{60-80}$ straight-chain aliphatic group. In certain embodiments, such straight-chain aliphatic groups are saturated, while in other embodiments, they contain one or more sites of unsaturation. In certain embodiments, such groups comprise or are derived from the chain of a naturally-occurring material such as a long-chain fatty acid.

In embodiments where

comprises a saturated straight aliphatic chain, suitable chains include, but are not limited to those corresponding to common fatty acids. In certain embodiments suitable chains for compounds conforming to formula P1 include, but are not limited to those shown in Table 1:

TABLE 1

Examples of Saturated Fatty Acids

| Common name of fatty acid | Aliphatic group |
|---|---|
| Caprylic acid | $CH_3(CH_2)_6-$ |
| Capric acid | $CH_3(CH_2)_8-$ |
| Laurie acid | $CH_3(CH_2)_{10}-$ |
| Myristic acid | $CH_3(CH_2)_{12}-$ |
| Palmitic acid | $CH_3(CH_2)_{14}-$ |
| Stearic acid | $CH_3(CH_2)_{16}-$ |
| Rachidic acid | $CH_3(CH_2)_{18}-$ |
| Behenic acid | $CH_3(CH_2)_{20}-$ |
| Lignoceric acid | $CH_3(CH_2)_{22}-$ |
| Cerotic acid | $CH_3(CH_2)_{24}-$ |

In embodiments where

—$[C_xH_y]$ comprises an unsaturated straight aliphatic chain, suitable chains include, but are not limited to those corresponding to unsaturated fatty acids. In certain embodiments suitable chains include, but are not limited to those shown in Table 2:

TABLE 2

Examples of Unsaturated Fatty Acids

| Common name of fatty acid | Corresponding Aliphatic Group | $\Delta^x$ |
|---|---|---|
| Myristoleic acid | $CH_3(CH_2)_3CH=CH(CH_2)_7-$ | cis-$\Delta^9$ |
| Palmitoleic acid | $CH_3(CH_2)_5CH=CH(CH_2)_7-$ | cis-$\Delta^9$ |
| Sapienic acid | $CH_3(CH_2)_8CH=CH(CH_2)_4-$ | cis-$\Delta^6$ |
| Oleic acid | $CH_3(CH_2)_7CH=CH(CH_2)_7-$ | cis-$\Delta^9$ |
| Elaidic acid | $CH_3(CH_2)_7CH=CH(CH_2)_7-$ | trans-$\Delta^9$ |
| Vaccenic acid | $CH_3(CH_2)_5CH=CH(CH_2)_9-$ | trans-$\Delta^{11}$ |
| Linoleic acid | $CH_3(CH_2)_4CH=CHCH_2CH=CH(CH_2)_7-$ | cis,cis-$\Delta^9,\Delta^{12}$ |
| Linoelaidic acid | $CH_3(CH_2)_4CH=CHCH_2CH=CH(CH_2)_7-$ | trans, trans-$\Delta^9,\Delta^{12}$ |
| α-Linolenic acid | $CH_3CH_2CH=CHCH_2CH=CHCH_2CH=CH(CH_2)_7-$ | cis, cis, cis-$\Delta^9,\Delta^{12},\Delta^{15}$ |
| Arachidonic acid | $CH_3(CH_2)_4CH=CHCH_2CH=CHCH_2CH=CHCH_2CH=CH(CH_2)_3-$ | cis,cis,cis, cis-$\Delta^5,\Delta^8$, $\Delta^{11},\Delta^{14}$ |
| Eicosapentaenoic acid | $CH_3CH_2CH=CHCH_2CH=CHCH_2CH=CHCH_2CH=CHCH_2CH=CH(CH_2)_3-$ | cis, cis, cis, cis, cis-$\Delta^5$, $\Delta^8$, $\Delta^{11},\Delta^{14},\Delta^{17}$ |
| Erucic acid | $CH_3(CH_2)_7CH=CH(CH_2)_{11}-$ | cis-$\Delta^{13}$ |
| Docosahexaenoic acid | $CH_3CH_2CH=CHCH_2CH=CHCH_2CH=CHCH_2CH=CHCH_2CH=CHCH_2CH=CH(CH_2)_2-$ | cis,cis,cis, cis,cis,cis-$\Delta^4,\Delta^7,\Delta^{10}$, $\Delta^{13},\Delta^{16},\Delta^{19}$ |

In certain embodiments,

—$[C_xH_y]$ comprises a semisynthetic derivative of a fatty acid. Numerous processes are known in the art for the chemical modification of fatty acid feedstocks, such processes include, but are not limited to: complete or partial hydrogenation, olefin isomerization, olefin metathesis, hydride reduction and the like. Such semisynthetic materials and processes will be readily apprehended by the skilled artisan and can be utilized to make inventive compounds of formulae I, P1, and P1a.

In embodiments, for compounds of formulae I, P1, and P1a,

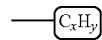

comprises a branched aliphatic group. In certain embodiments, such aliphatic groups comprise from 4 to about 80 carbon atoms. In certain embodiments,

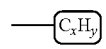

comprises a $C_{4-6}$ branched-chain aliphatic group. In certain embodiments,

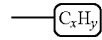

comprises a $C_{7-12}$ branched-chain aliphatic group. In certain embodiments,

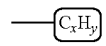

comprises a $C_{12-16}$ branched-chain aliphatic group. In certain embodiments,

—

comprises a $C_{16-20}$ branched-chain aliphatic group. In certain embodiments,

—

comprises a $C_{20-24}$ branched-chain aliphatic group, a $C_{24-28}$ branched-chain aliphatic group, a $C_{28-36}$ branched-chain aliphatic group, or a $C_{36-40}$ branched-chain aliphatic group. In certain embodiments, —

comprises a $C_{40-60}$ branched-chain aliphatic group or a $C_{60-80}$ branched-chain aliphatic group. In certain embodiments, such branched-chain aliphatic groups are saturated, while in other embodiments, they contain one or more sites of unsaturation.

In certain embodiments,

—

comprises a saturated aliphatic group with a branch present at the site of attachment of the —

moiety to the aliphatic polycarbonate moiety. In certain other embodiments, the point of attachment of the —

moiety to the aliphatic polycarbonate moiety is not a point of branching.

In certain embodiments where

—

comprises a saturated aliphatic group with a branch resent at a site other than the site of attachment to the polycarbonate moiety, the —

moiety comprises a $C_{3-40}$ straight carbon chain with one or more alkyl substituents. In certain embodiments, the —

moiety comprises a $C_{4-40}$ straight carbon chain with 1-12 alkyl substituents. In certain embodiments, the —

moiety comprises a $C_{4-40}$ straight carbon chain with 1-12 alkyl substituents, where each alkyl substituent is independently a $C_{1-12}$ straight or branched alkyl. In certain embodiments, the —

moiety comprises a $C_{4-20}$ straight carbon chain with 1-6 alkyl substituents, where each alkyl substituent is independently a $C_{1-6}$ straight or branched alkyl. In certain embodiments, the —

moiety comprises a $C_{6-12}$ straight carbon chain with 1-4 alkyl substituents, where each alkyl substituent is independently a $C_{1-4}$ straight or branched alkyl. In certain embodiments, the —

moiety comprises a $C_{4-20}$ straight carbon chain with 1-6 alkyl substituents, where each alkyl substituent is independently a methyl or ethyl group.

In certain embodiments where

—

comprises a saturated aliphatic group with a branch present at a site other than the site of attachment to the polycarbonate moiety, the —

moiety comprises a moiety selected from the group consisting of: sec-butyl, 2-methylbutane, 3-methylbutane, 2-methylpentane, 3-methylpentane, 4-methylpentane, 2-methylhexane, 3-methylhexane, 4-methylhexane, 5-methylhexane, 2-methylheptane, 3-methylheptane, 4-methylheptane, 5-methylheptane, 6-methylheptane, 2-methyloctane, 3-methyloctane, 4-methyloctane, 5-methyloctane, 6-methyloctane, 7-methyloctane, 2-methylnonane, 3-methylnonane, 4-methylnonane, 5-methylnonane, 6-methylnonane, 7-methylnonane, 8-methylnonane, 2-methyldecane, 3-methyldecane, 4-methyldecane, 5-methyldecane, 6-methyldecane, 7-methyldecane, 8-methyldecane, 9-methyldecane, 2-methylundecane, 3-methylundecane, 4-methylundecane, 5-methylundecane, 6-methylundecane, 7-methylundecane, 8-methylundecane, 9-methylundecane, 10-methylundecane, 2-methyldodecane, 3-methyldodecane, 4-methyldodecane, 5-methyldodecane, 6-methyldodecane, 7-methyldodecane, 8-methyldodecane, 9-methyldodecane, 10-methyldodecane, 11-methyldodecane, 2-ethylbutane, 2-ethylpentane, 3-ethylpentane, 2-ethylhexane, 3-ethylhexane, 4-ethylhexane, 2-ethylheptane, 3-ethylheptane, 4-ethylheptane, 5-ethylheptane, 2-ethyloctane, 3-ethyloctane, 4-ethyloctane, 5-ethyloctane, 6-ethyloctane, 2-ethylnonane, 3-ethylnonane, 4-ethylnonane, 5-ethylnonane, 6-ethylnonane, 7-ethylnonane, 2-ethyldecane, 3-ethyldecane, 4-ethyldecane, 5-ethyldecane, 6-ethyldecane, 7-ethyldecane, 8-ethyldecane, 2-ethylundecane, 3-ethylundecane, 4-ethylundecane, 5-ethylundecane, 6-ethylundecane, 7-ethylundecane, 8-ethylundecane, 9-ethylundecane, 2-ethyldodecane, 3-ethyldodecane, 4-ethyldodecane, 5-ethyldodecane, 6-ethyldodecane, 7-ethyldodecane, 8-ethyldodecane, 9-ethyldodecane, 10-ethyldodecane, and combinations of any two or more of these.

For avoidance of doubt with respect to interpretation of chemical structures, where a

moiety is selected from the group above, the point of connection to the APC moiety is to be interpreted as C-1. Therefore, if

in a compound of formula P1 were chosen from the group above to be 5-methylheptane, then the compound would have a structure:

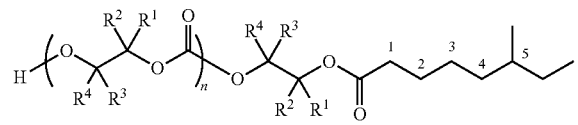

In certain embodiments where

comprises a saturated aliphatic group with a branch present at a site other than the site of attachment to the polycarbonate moiety,

comprises a moiety selected from the group consisting of: a $C_5$ straight chain alkyl having two substituents independently selected from $C_{1-4}$ straight or branched alkyl; a $C_6$ straight chain alkyl having 2-3 substituents independently selected from $C_{1-4}$ straight or branched alkyl; a $C_7$ straight chain alkyl having 2-3 substituents independently selected from $C_{1-4}$ straight or branched alkyl; a $C_8$ straight chain alkyl having 2-4 substituents independently selected from $C_{1-4}$ straight or branched alkyl; a $C_9$ straight chain alkyl having 2-4 substituents independently selected from $C_{1-4}$ straight or branched alkyl; a $C_{10}$ straight chain alkyl having 2-4 substituents independently selected from $C_{1-4}$ straight or branched alkyl; a $C_{11-12}$ straight chain alkyl having 2-4 substituents independently selected from $C_{1-4}$ straight or branched alkyl; a $C_{12-16}$ straight chain alkyl having 2-5 substituents independently selected from $C_{1-4}$ straight or branched alkyl; a $C_{16-20}$ straight chain alkyl having 2-6 substituents independently selected from $C_{1-4}$ straight or branched alkyl; and a $C_{20-40}$ straight chain alkyl having 2-12 substituents independently selected from $C_{1-4}$ straight or branched alkyl.

In certain embodiments, a

moiety comprises

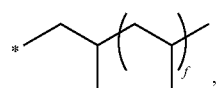

where * represents the site of attachment of the

moiety to the polycarbonate moiety, and f is an integer from 1 to 12.

In certain embodiments, a

moiety is selected from the group consisting of:

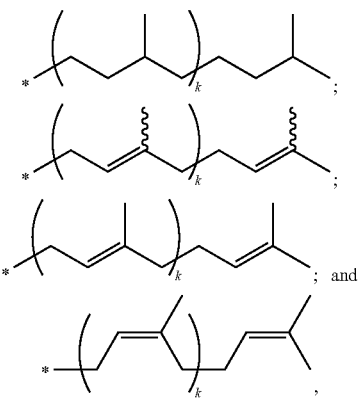

where k is an integer from 0 to 10.

In embodiments, where a branch occurs at the site of attachment of the

moiety to the aliphatic polycarbonate moiety, such a compound can conform to formula P3a:

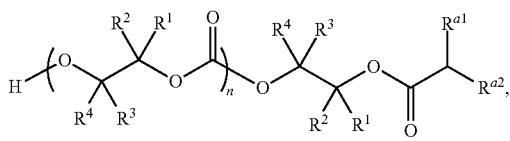

where each of $R^1$, $R^2$, $R^3$, $R^4$, and n is as defined above and in the classes and subclasses herein, and $R^{a1}$ and $R^{a2}$ are each independently a $C_{1-40}$ aliphatic group.

In certain embodiments for compounds conforming to formula P3a, each of $R^{a1}$ and $R^{a2}$ comprises a straight chain aliphatic group. In certain embodiments, each of $R^{a1}$ and $R^{a2}$ is independently selected from the group consisting of $C_{1-40}$ aliphatic groups, wherein $R^{a1}$ and $R^{a2}$ taken together with the carbon atom to which they are attached contain more than 4 carbon atoms. In certain embodiments, $R^{a1}$ and $R^{a2}$ together with the carbon atom to which they are attached contain between 4 and 80 carbon atoms. In certain embodiments, $R^{a1}$ and $R^{a2}$ and the carbon atom to which they are attached comprise at least 6, at least 8, at least 10, at least 12, at least 16, at least 20, at least 24, at least 30, at least 34, or at least 38 carbon atoms.

In certain embodiments,

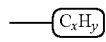

is selected from the group consisting of: 2-butane, 2-pentane, 3-pentane, 2-hexane, 3-hexane, 2-heptane, 3-heptane, 4-heptane, 2-octane, 3-octane, 4-octane, 2-nonane, 3-nonane, 4-nonane, 5-nonane, 2-decane, 3-decane, 4-decane, 5-decane, 2-undecane, 3-undecane, 4-undecane, 5-undecane, 6-undecane, 2-dodecane, 3-dodecane, 4-dodecane, 5-dodecane, 6-dodecane, and combinations of any two or more of these.

For avoidance of doubt with respect to interpretation of chemical structures, if

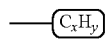

in a compound of formula P3a were chosen from the group above to be 4-heptane, then the compound would have a structure:

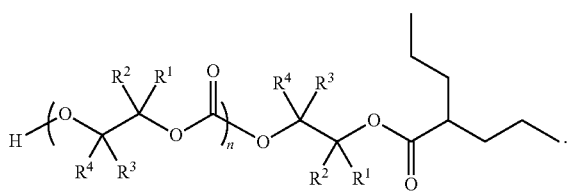

In certain embodiments for compounds conforming to formula P3a, at least one of $R^{a1}$ and $R^{a2}$ comprises one or more branch points. As used herein, the term "branch point" refers to an atom which is attached to three or more non-hydrogen atoms. In some embodiments, a branch point is a carbon atom attached to three or more carbon atoms.

In certain embodiments, one or more of $R^{a1}$ and $R^{a2}$ comprises methyl or ethyl substituents. In certain embodiments, $R^{a1}$ and $R^{a2}$ are independently selected from the group consisting of: methyl, ethyl, propyl, butyl, n-pentane, n-hexane, n-heptane, n-octane, any $C_{9-40}$ n-alkyl, isopropyl, isobutyl, sec-butyl, 2-methylbutyl, 3-methylbutane, 2-methylpentane, 3-methylpentane, 4-methylpentane, 2-methylhexane, 3-methylhexane, 4-methylhexane, 5-methylhexane, 2-methylheptane, 3-methylheptane, 4-methylheptane, 5-methylheptane, 6-methylheptane, 2-methyloctane, 3-methyloctane, 4-methyloctane, 5-methyloctane, 6-methyloctane, 7-methyloctane, 2-methylnonane, 3-methylnonane, 4-methylnonane, 5-methylnonane, 6-methylnonane, 7-methylnonane, 8-methylnonane, 2-methyldecane, 3-methyldecane, 4-methyldecane, 5-methyldecane, 6-methyldecane, 7-methyldecane, 8-methyldecane, 9-methyldecane, 2-methylundecane, 3-methylundecane, 4-methylundecane, 5-methylundecane, 6-methylundecane, 7-methylundecane, 8-methylundecane, 9-methylundecane, 10-methylundecane, 2-methyldodecane, 3-methyldodecane, 4-methyldodecane, 5-methyldodecane, 6-methyldodecane, 7-methyldodecane, 8-methyldodecane, 9-methyldodecane, 10-methyldodecane, 11-methyldodecane, 2-ethylbutane, 2-ethylpentane, 3-ethylpentane, 2-ethylhexane, 3-ethylhexane, 4-ethylhexane, 2-ethylheptane, 3-ethylheptane, 4-ethylheptane, 5-ethylheptane, 2-ethyloctane, 3-ethyloctane, 4-ethyloctane, 5-ethyloctane, 6-ethyloctane, 2-ethylnonane, 3-ethylnonane, 4-ethylnonane, 5-ethylnonane, 6-ethylnonane, 7-ethylnonane, 2-ethyldecane, 3-ethyldecane, 4-ethyldecane, 5-ethyldecane, 6-ethyldecane, 7-ethyldecane, 8-ethyldecane, 2-ethylundecane, 3-ethylundecane, 4-ethylundecane, 5-ethylundecane, 6-ethylundecane, 7-ethylundecane, 8-ethylundecane, 9-ethylundecane, 2-ethyldodecane, 3-ethyldodecane, 4-ethyldodecane, 5-ethyldodecane, 6-ethyldodecane, 7-ethyldodecane, 8-ethyldodecane, 9-ethyldodecane, 10-ethyldodecane, and combinations of any two or more of these; wherein $R^{a1}$ and $R^{a2}$ together with the carbon atom to which they are attached comprise at least 4 carbon atoms. In certain embodiments, $R^{a1}$ and $R^{a2}$ together with the carbon atom to which they are at attached comprise at least 6, at least 8, at least 10, at least 12, at least 16, at least 20, at least 24, at least 30, at least 34 or at least 38 carbon atoms.

For avoidance of doubt with respect to interpretation of chemical structures, in a compound of formula P1 where the

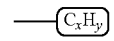

comprises

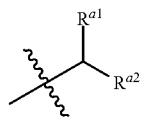

and $R^{a1}$ and $R^{a2}$ are selected from the group above such that $R^{a1}$ is n-butyl and $R^{a2}$ is 3-methylhexane, then the compound would have a structure:

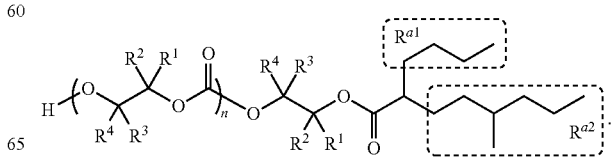

In certain embodiments for compounds conforming to formula P3a, at least one of $R^{a1}$ and $R^{a2}$ is selected from the group consisting of: a $C_5$ straight chain alkyl having 1-2 substituents independently selected from $C_{1-4}$ straight or branched alkyl; a $C_6$ straight chain alkyl having 1-3 substituents independently selected from $C_{1-4}$ straight or branched alkyl; a $C_7$ straight chain alkyl having 1-3 substituents independently selected from $C_{1-4}$ straight or branched alkyl; a $C_8$ straight chain alkyl having 1-4 substituents independently selected from $C_{1-4}$ straight or branched alkyl; a $C_9$ straight chain alkyl having 1-4 substituents independently selected from $C_{1-4}$ straight or branched alkyl; a $C_{10}$ straight chain alkyl having 1-4 substituents independently selected from $C_{1-4}$ straight or branched alkyl; a $C_{11-12}$ straight chain alkyl having 1-4 substituents independently selected from $C_{1-4}$ straight or branched alkyl; a $C_{12-16}$ straight chain alkyl having 1-5 substituents independently selected from $C_{1-4}$ straight or branched alkyl; a $C_{16-20}$ straight chain alkyl having 1-6 substituents independently selected from $C_{1-4}$ straight or branched alkyl; and a a $C_{20-40}$ straight chain alkyl having 1-12 substituents independently selected from $C_{1-4}$ straight or branched alkyl.

In certain embodiments, at least one of $R^{a1}$ and $R^{a2}$ comprises

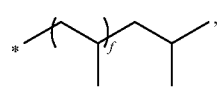

where * represents the site of attachment of the

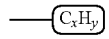

moiety to the polycarbonate moiety, and f is an integer from 1 to 12.

In certain embodiments, at least one of $R^{a1}$ and $R^{a2}$ comprises is selected from the group consisting of:

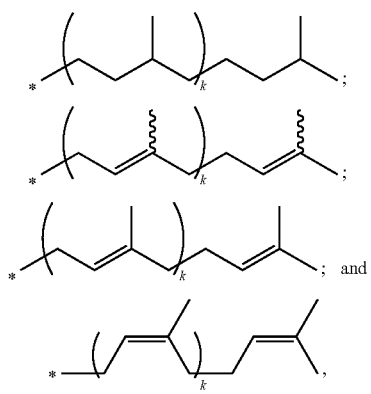

where k is an integer from 0 to 10.

c. Detailed Description of the Block Copolymers

Having described in some detail the structures and characteristics of each of the two components which make up the block copolymer materials of the present invention, we now turn to the combinations of those components. The present invention encompasses materials of formula P1 comprising any of the APC segments described above in combination with any of the hydrocarbon segments described above. In certain embodiments, the invention encompasses compositions comprising mixtures of any two or more such materials.

The present invention can be regarded as encompassing a family of related materials that can be divided into genera based on two primary characteristics:

i) the size of the hydrocarbon moiety

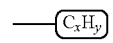

which can be in Category A (polymers with more than about 80 carbon atoms) or Category B (aliphatic groups with between about 4 and 80 carbon atoms); and ii) the molecular weight range of the APC unit, which can be in any of three ranges described above as Category 1 (400 to 5,000 g/mol), Category 2 (40,000+ g/mol), and Category 3 (5,000 to 40,000 g/mol).

For convenience, compositions of the present invention are described below based on their association within these three categories. For example, a compound referred to as type P1-B-2 will conform to formula P1, and in certain embodiments will contain a

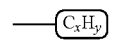

moiety with fewer than 80 carbon atoms and will have an APC moiety having more than about 40 repeat units in the chain. Materials in each of the resulting 6 families (P1-A-1; P1-A-2; P1-A-3; P1-B-1; P1-B-2; and P1-B-3) have unique features and can be profitably employed for specific applications. For example, materials belonging to category P1-A-1 have a high hydrocarbon-to-APC ratio and are therefore more hydrophobic than materials in other categories. Conversely, materials belonging to category P1-B-2 have low hydrocarbon-to-APC ratios. Materials in any of category P1A-1 through P1-A-3 and P1-B-2 have relatively high molecular weights and are mostly solids, glasses, or waxes. Materials in categories B-1 and B-3 have relatively lower molecular weights and include materials that are liquids. The choice of whether to apply a composition from one genus or another will depend upon the intended application as further described below.

In certain embodiments, the present invention provides compositions denoted P1-A-1. These materials are generally solids or waxes and are relatively hydrophobic.

Such materials conform to formula P1:

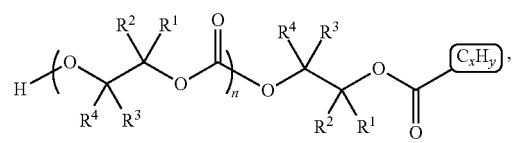

where each of $R^1$, $R^2$, $R^3$, and $R^4$ are as defined above and in the classes and subclasses herein;

n is an integer from 4 to about 50; and the moiety

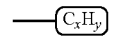

comprises a hydrocarbon having more than about 80 carbon atoms.

In certain embodiments, compositions of the present invention comprise materials of category P1-A-1 wherein each of the variables $R^1$, $R^2$, $R^3$, and $R^4$ is at each occurrence —H (e.g. the APC portion of the molecule comprises a poly(ethylene carbonate) chain. In certain embodiments, compositions of the present invention comprise materials of category P1-A-1 wherein three of the variables $R^1$, $R^2$, $R^3$, and $R^4$ are at each occurrence —H and the remaining variable is —$CH_3$ (e.g. the APC portion of the molecule comprises a poly(propylene carbonate) chain.

In certain embodiments, compositions of the present invention comprise materials of category P1-A-1 wherein n is, on average in the composition, between about 4 and about 8. In certain embodiments, compositions of the present invention comprise materials of category P1-A-1 wherein n is, on average in the composition, between about 6 and about 10. In certain embodiments, compositions of the present invention comprise materials of category P1-A-1 wherein n is, on average in the composition, between about 8 and about 12. In certain embodiments, compositions of the present invention comprise materials of category P1-A-1 wherein n is, on average in the composition, between about 12 and about 16. In certain embodiments, compositions of the present invention comprise materials of category P1-A-1 wherein n is, on average in the composition, between about 16 and about 20. In certain embodiments, compositions of the present invention comprise materials of category P1-A-1 wherein n is, on average in the composition, between about 20 and about 40. In certain embodiments, compositions of the present invention comprise materials of category P1-A-1 wherein n is, on average in the composition, between about 30 and about 50.

In certain embodiments, compositions of the present invention comprise materials of category P1-A-1 wherein the moiety —[$C_xH_y$]

comprises a polyethylene chain. In certain embodiments, compositions of the present invention comprise materials of category P1-A-1 wherein the moiety —[$C_xH_y$]

comprises polyethylene with an Mn of between about 1,000 and about 5,000 g/mol. In certain embodiments, the moiety —[$C_xH_y$]

in materials of category P1-A-1 comprises polyethylene with an Mn of between about 3,500 and about 10,000 g/mol. In certain embodiments, the moiety —[$C_xH_y$]

in materials of category P1-A-1 comprises polyethylene with an Mn of between about 10,000 and about 100,000 g/mol.

In certain embodiments, compositions of the present invention comprise materials of category P1-A-1 wherein the moiety —[$C_xH_y$]

comprises a polypropylene chain. In certain embodiments, compositions of the present invention comprise materials of category P1-A-1 wherein the moiety —[$C_xH_y$]

comprises polypropylene with an Mn of between about 1,000 and about 5,000 g/mol. In certain embodiments, the moiety —[$C_xH_y$]

in materials of category P1-A-1 comprises polypropylene with an Mn of between about 3,500 and about 10,000 g/mol. In certain embodiments, the moiety —[$C_xH_y$]

in materials of category P1-A-1 comprises polypropylene with an Mn of between about 3,500 and about 10,000 g/mol. In certain embodiments, the moiety —[$C_xH_y$]

in materials of category P1-A-1 comprises polypropylene with an Mn of between about 10,000 and about 100,000 g/mol.

In certain embodiments, the present invention comprises materials of category P1-A-1 selected from Table 3.

TABLE 3

| Designation | APC identity | n | CxHy identity | CxHy (g/mol) |
|---|---|---|---|---|
| P1-A-1a | [structure] | 4 | PE | 1,000 |
| P1-A-1b | [structure] | 4 | PE | 1,000 |

TABLE 3-continued

| Designation | APC identity | n | CxHy identity | CxHy (g/mol) |
|---|---|---|---|---|
| P1-A-1c | | 6 | PE | 1,000 |
| P1-A-1d | | 6 | PE | 1,000 |
| P1-A-1e | | 8 | PE | 1,000 |
| P1-A-1f | | 8 | PE | 1,000 |
| P1-A-1g | | 12 | PE | 1,000 |
| P1-A-1h | | 12 | PE | 1,000 |
| P1-A-1i | | 4 | PP | 1,000 |
| P1-A-1j | | 4 | PP | 1,000 |
| P1-A-1k | | 6 | PP | 1,000 |
| P1-A-1l | | 6 | PP | 1,000 |
| P1-A-1m | | 8 | PP | 1,000 |
| P1-A-1n | | 8 | PP | 1,000 |
| P1-A-1o | | 12 | PP | 1,000 |
| P1-A-1p | | 12 | PP | 1,000 |
| P1-A-1q | | 4 | PE | 2,000 |
| P1-A-1r | | 4 | PE | 2,000 |
| P1-A-1s | | 6 | PE | 2,000 |
| P1-A-1t | | 6 | PE | 2,000 |
| P1-A-1u | | 8 | PE | 2,000 |
| P1-A-1v | | 8 | PE | 2,000 |
| P1-A-1w | | 12 | PE | 2,000 |
| P1-A-1x | | 12 | PE | 2,000 |
| P1-A-1y | | 4 | PP | 2,000 |
| P1-A-1z | | 4 | PP | 2,000 |

TABLE 3-continued

| Designation | APC identity | n | CxHy identity | CxHy (g/mol) |
|---|---|---|---|---|
| P1-A-1aa | [structure] | 6 | PP | 2,000 |
| P1-A-1ab | [structure] | 6 | PP | 2,000 |
| P1-A-1ac | [structure] | 8 | PP | 2,000 |
| P1-A-1ad | [structure] | 8 | PP | 2,000 |
| P1-A-1ae | [structure] | 12 | PP | 2,000 |
| P1-A-1af | [structure] | 12 | PP | 2,000 |
| P1-A-1a | [structure] | 4 | PE | 3,000 |
| P1-A-1b | [structure] | 4 | PE | 3,000 |
| P1-A-1c | [structure] | 6 | PE | 3,000 |
| P1-A-1d | [structure] | 6 | PE | 3,000 |
| P1-A-1e | [structure] | 8 | PE | 3,000 |
| P1-A-1f | [structure] | 8 | PE | 3,000 |
| P1-A-1g | [structure] | 12 | PE | 3,000 |
| P1-A-1h | [structure] | 12 | PE | 3,000 |
| P1-A-1i | [structure] | 4 | PP | 3,000 |
| P1-A-1j | [structure] | 4 | PP | 3,000 |
| P1-A-1k | [structure] | 6 | PP | 3,000 |
| P1-A-1l | [structure] | 6 | PP | 3,000 |
| P1-A-1m | [structure] | 8 | PP | 3,000 |
| P1-A-1n | [structure] | 8 | PP | 3,000 |
| P1-A-1o | [structure] | 12 | PP | 3,000 |
| P1-A-1p | [structure] | 12 | PP | 3,000 |
| P1-A-1q | [structure] | 4 | PE | 10,000 |
| P1-A-1r | [structure] | 4 | PE | 10,000 |

TABLE 3-continued

| Designation | APC identity | n | CxHy identity | CxHy (g/mol) |
|---|---|---|---|---|
| P1-A-1s | | 6 | PE | 10,000 |
| P1-A-1t | | 6 | PE | 10,000 |
| P1-A-1u | | 8 | PE | 10,000 |
| P1-A-1v | | 8 | PE | 10,000 |
| P1-A-1w | | 12 | PE | 10,000 |
| P1-A-1x | | 12 | PE | 10,000 |
| P1-A-1y | | 4 | PE | 20,000 |
| P1-A-1z | | 4 | PE | 20,000 |
| P1-A-1aa | | 6 | PE | 20,000 |
| P1-A-1ab | | 6 | PE | 20,000 |
| P1-A-1ac | | 8 | PE | 20,000 |
| P1-A-1ad | | 8 | PE | 20,000 |
| P1-A-1ae | | 12 | PE | 20,000 |
| P1-A-1af | | 12 | PE | 20,000 |

In certain embodiments, the present invention provides compositions denoted P1-A-2. Such materials have a formula P1:

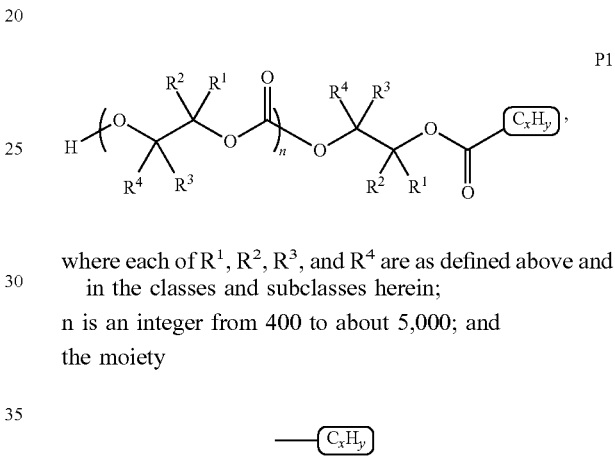

where each of $R^1$, $R^2$, $R^3$, and $R^4$ are as defined above and in the classes and subclasses herein;

n is an integer from 400 to about 5,000; and the moiety

—$C_xH_y$ comprises a hydrocarbon having more than about 80 carbon atoms.

In certain embodiments, compositions of the present invention comprise materials of category P1-A-2 wherein each of the variables $R^1$, $R^2$, $R^3$, and $R^4$ is at each occurrence —H (e.g. the APC portion of the molecule comprises a poly(ethylene carbonate) chain. In certain embodiments, compositions of the present invention comprise materials of category P1-A-2 wherein three of the variables $R^1$, $R^2$, $R^3$, and $R^4$ are at each occurrence —H and the remaining variable is —$CH_3$ (e.g. the APC portion of the molecule comprises a poly(propylene carbonate) chain.

In certain embodiments, compositions of the present invention comprise materials of category P1-A-2 wherein n is, on average in the composition, between about 400 and about 600. In certain embodiments, compositions of the present invention comprise materials of category P1-A-2 wherein n is, on average in the composition, between about 500 and about 1,500. In certain embodiments, compositions of the present invention comprise materials of category P1-A-2 wherein n is, on average in the composition, between about 1,500 and about 3,000. In certain embodiments, compositions of the present invention comprise materials of category P1-A-2 wherein n is, on average in the composition, between about 3,000 and about 5,000.

In certain embodiments, compositions of the present invention comprise materials of category P1-A-2 wherein the moiety

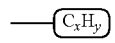

comprises a polyethylene chain. In certain embodiments, compositions of the present invention comprise materials of category P1-A-2 wherein the moiety

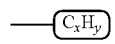

comprises polyethylene with an Mn of between about 1,000 and about 5,000 g/mol. In certain embodiments, the moiety

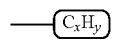

in materials of category P1-A-2 comprises polyethylene with an Mn of between about 3,500 and about 10,000 g/mol. In certain embodiments, the moiety

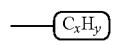

in materials of category P1-A-2 comprises polyethylene with an Mn of between about 3,500 and about 10,000 g/mol. In certain embodiments, the moiety

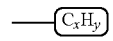

in materials of category P1-A-2 comprises polyethylene with an Mn of between about 10,000 and about 100,000 g/mol. In certain embodiments, the moiety

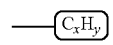

in materials of category P1-A-2 comprises polyethylene with an Mn above about 100,000 g/mol.

In certain embodiments, compositions of the present invention comprise materials of category P1-A-2 wherein the moiety

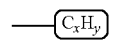

comprises a polypropylene chain. In certain embodiments, compositions of the present invention comprise materials of category P1-A-2 wherein the moiety

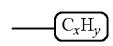

comprises polypropylene with an Mn of between about 1,000 and about 5,000 g/mol. In certain embodiments, the moiety

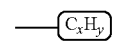

in materials of category P1-A-2 comprises polypropylene with an Mn of between about 3,500 and about 10,000 g/mol. In certain embodiments, the moiety

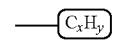

in materials of category P1-A-2 comprises polypropylene with an Mn of between about 3,500 and about 10,000 g/mol. In certain embodiments, the moiety

in materials of category P1-A-2 comprises polypropylene with an Mn of between about 10,000 and about 100,000 g/mol. In certain embodiments, the moiety

in materials of category P1-A-2 comprises polypropylene with an Mn above about 100,000 g/mol.

In certain embodiments, the present invention comprises materials of category P1-A-2 selected from Table 4.

TABLE 4

| Designation | APC identity | n | CxHy identity | CxHy (g/mol) |
|---|---|---|---|---|
| P1-A-1a | | 400 | PE | 1,000 |
| P1-A-1b | | 400 | PE | 1,000 |
| P1-A-1c | | 750 | PE | 1,000 |
| P1-A-1d | | 750 | PE | 1,000 |
| P1-A-1e | | 1000 | PE | 1,000 |
| P1-A-1f | | 1000 | PE | 1,000 |

TABLE 4-continued

| Designation | APC identity | n | CxHy identity | CxHy (g/mol) |
|---|---|---|---|---|
| P1-A-1g | H−(O−CH(CH₃)−CH₂−O−C(=O)−O)ₙ−⁓ | 2000 | PE | 1,000 |
| P1-A-1h | H−(O−CH₂−CH₂−O−C(=O)−O)ₙ−⁓ | 2000 | PE | 1,000 |
| P1-A-1i | H−(O−CH(CH₃)−CH₂−O−C(=O)−O)ₙ−⁓ | 400 | PP | 1,000 |
| P1-A-1j | H−(O−CH₂−CH₂−O−C(=O)−O)ₙ−⁓ | 400 | PP | 1,000 |
| P1-A-1k | H−(O−CH(CH₃)−CH₂−O−C(=O)−O)ₙ−⁓ | 750 | PP | 1,000 |
| P1-A-1l | H−(O−CH₂−CH₂−O−C(=O)−O)ₙ−⁓ | 750 | PP | 1,000 |
| P1-A-1m | H−(O−CH(CH₃)−CH₂−O−C(=O)−O)ₙ−⁓ | 1000 | PP | 1,000 |
| P1-A-1n | H−(O−CH₂−CH₂−O−C(=O)−O)ₙ−⁓ | 1000 | PP | 1,000 |
| P1-A-1o | H−(O−CH(CH₃)−CH₂−O−C(=O)−O)ₙ−⁓ | 2000 | PP | 1,000 |
| P1-A-1p | H−(O−CH₂−CH₂−O−C(=O)−O)ₙ−⁓ | 2000 | PP | 1,000 |
| P1-A-1q | H−(O−CH(CH₃)−CH₂−O−C(=O)−O)ₙ−⁓ | 400 | PE | 2,000 |
| P1-A-1r | H−(O−CH₂−CH₂−O−C(=O)−O)ₙ−⁓ | 400 | PE | 2,000 |
| P1-A-1s | H−(O−CH(CH₃)−CH₂−O−C(=O)−O)ₙ−⁓ | 750 | PE | 2,000 |
| P1-A-1t | H−(O−CH₂−CH₂−O−C(=O)−O)ₙ−⁓ | 750 | PE | 2,000 |
| P1-A-1u | H−(O−CH(CH₃)−CH₂−O−C(=O)−O)ₙ−⁓ | 1000 | PE | 2,000 |
| P1-A-1v | H−(O−CH₂−CH₂−O−C(=O)−O)ₙ−⁓ | 1000 | PE | 2,000 |
| P1-A-1w | H−(O−CH(CH₃)−CH₂−O−C(=O)−O)ₙ−⁓ | 2000 | PE | 2,000 |
| P1-A-1x | H−(O−CH₂−CH₂−O−C(=O)−O)ₙ−⁓ | 2000 | PE | 2,000 |
| P1-A-1y | H−(O−CH(CH₃)−CH₂−O−C(=O)−O)ₙ−⁓ | 400 | PP | 2,000 |
| P1-A-1z | H−(O−CH₂−CH₂−O−C(=O)−O)ₙ−⁓ | 400 | PP | 2,000 |
| P1-A-1aa | H−(O−CH(CH₃)−CH₂−O−C(=O)−O)ₙ−⁓ | 750 | PP | 2,000 |
| P1-A-1ab | H−(O−CH₂−CH₂−O−C(=O)−O)ₙ−⁓ | 750 | PP | 2,000 |
| P1-A-1ac | H−(O−CH(CH₃)−CH₂−O−C(=O)−O)ₙ−⁓ | 1000 | PP | 2,000 |
| P1-A-1ad | H−(O−CH₂−CH₂−O−C(=O)−O)ₙ−⁓ | 1000 | PP | 2,000 |

TABLE 4-continued

| Designation | APC identity | n | CxHy identity | CxHy (g/mol) |
|---|---|---|---|---|
| P1-A-1ae | H-(O-CH(CH₃)-CH₂-O-C(=O)-O)ₙ- | 2000 | PP | 2,000 |
| P1-A-1af | H-(O-CH₂-CH₂-O-C(=O)-O)ₙ- | 2000 | PP | 2,000 |
| P1-A-1a | H-(O-CH(CH₃)-CH₂-O-C(=O)-O)ₙ- | 400 | PE | 10,000 |
| P1-A-1b | H-(O-CH₂-CH₂-O-C(=O)-O)ₙ- | 400 | PE | 10,000 |
| P1-A-1c | H-(O-CH(CH₃)-CH₂-O-C(=O)-O)ₙ- | 750 | PE | 10,000 |
| P1-A-1d | H-(O-CH₂-CH₂-O-C(=O)-O)ₙ- | 750 | PE | 10,000 |
| P1-A-1e | H-(O-CH(CH₃)-CH₂-O-C(=O)-O)ₙ- | 1000 | PE | 10,000 |
| P1-A-1f | H-(O-CH₂-CH₂-O-C(=O)-O)ₙ- | 1000 | PE | 10,000 |
| P1-A-1g | H-(O-CH(CH₃)-CH₂-O-C(=O)-O)ₙ- | 2000 | PE | 10,000 |
| P1-A-1h | H-(O-CH₂-CH₂-O-C(=O)-O)ₙ- | 2000 | PE | 10,000 |
| P1-A-1i | H-(O-CH(CH₃)-CH₂-O-C(=O)-O)ₙ- | 400 | PP | 20,000 |
| P1-A-1j | H-(O-CH₂-CH₂-O-C(=O)-O)ₙ- | 400 | PP | 20,000 |
| P1-A-1k | H-(O-CH(CH₃)-CH₂-O-C(=O)-O)ₙ- | 750 | PP | 20,000 |
| P1-A-1l | H-(O-CH₂-CH₂-O-C(=O)-O)ₙ- | 750 | PP | 20,000 |
| P1-A-1m | H-(O-CH(CH₃)-CH₂-O-C(=O)-O)ₙ- | 1000 | PP | 20,000 |
| P1-A-1n | H-(O-CH₂-CH₂-O-C(=O)-O)ₙ- | 1000 | PP | 20,000 |
| P1-A-1o | H-(O-CH(CH₃)-CH₂-O-C(=O)-O)ₙ- | 2000 | PP | 20,000 |
| P1-A-1p | H-(O-CH₂-CH₂-O-C(=O)-O)ₙ- | 2000 | PP | 20,000 |
| P1-A-1q | H-(O-CH(CH₃)-CH₂-O-C(=O)-O)ₙ- | 400 | PE | 100,000 |
| P1-A-1r | H-(O-CH₂-CH₂-O-C(=O)-O)ₙ- | 400 | PE | 100,000 |
| P1-A-1s | H-(O-CH(CH₃)-CH₂-O-C(=O)-O)ₙ- | 750 | PE | 100,000 |
| P1-A-1t | H-(O-CH₂-CH₂-O-C(=O)-O)ₙ- | 750 | PE | 100,000 |
| P1-A-1u | H-(O-CH(CH₃)-CH₂-O-C(=O)-O)ₙ- | 1000 | PE | 100,000 |
| P1-A-1v | H-(O-CH₂-CH₂-O-C(=O)-O)ₙ- | 1000 | PE | 100,000 |

TABLE 4-continued

| Designation | APC identity | n | CxHy identity | CxHy (g/mol) |
|---|---|---|---|---|
| P1-A-1w | | 2000 | PE | 100,000 |
| P1-A-1x | | 2000 | PE | 100,000 |
| P1-A-1y | | 400 | PE | 200,000 |
| P1-A-1z | | 400 | PE | 200,000 |
| P1-A-1aa | | 750 | PE | 200,000 |
| P1-A-1ab | | 750 | PE | 200,000 |
| P1-A-1ac | | 1000 | PE | 200,000 |
| P1-A-1ad | | 1000 | PE | 200,000 |
| P1-A-1ae | | 2000 | PE | 200,000 |
| P1-A-1af | | 2000 | PE | 200,000 |

In certain embodiments, the present invention provides compositions denoted P1-B-2. These materials are generally solids or waxes and are relatively hydrophobic.

Such materials conform to formula P1:

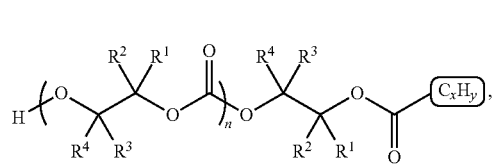

P1 where each of $R^1$, $R^2$, $R^3$, and $R^4$ are as defined above and in the classes and subclasses herein;
n is an integer from 4 to about 50; and
the moiety

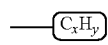

comprises a hydrocarbon having between about 4 and about 80 carbon atoms.

In certain embodiments, compositions of the present invention comprise materials of category P1-B-2 wherein each of the variables $R^1$, $R^2$, $R^3$, and $R^4$ is at each occurrence —H (e.g. the APC portion of the molecule comprises a poly(ethylene carbonate) chain. In certain embodiments, compositions of the present invention comprise materials of category P1-B-2 wherein three of the variables $R^1$, $R^2$, $R^3$, and $R^4$ are at each occurrence —H and the remaining variable is —CH$_3$ (e.g. the APC portion of the molecule comprises a poly(propylene carbonate) chain.

In certain embodiments, compositions of the present invention comprise materials of category P1-B-2 wherein n is, on average in the composition, between about 4 and about 8. In certain embodiments, compositions of the present invention comprise materials of category P1-B-2 wherein n is, on average in the composition, between about 6 and about 10. In certain embodiments, compositions of the present invention comprise materials of category P1-B-2 wherein n is, on average in the composition, between about 8 and about 12. In certain embodiments, compositions of the present invention comprise materials of category P1-B-2 wherein n is, on average in the composition, between about 12 and about 16. In certain embodiments, compositions of the present invention comprise materials of category P1-B-2 wherein n is, on average in the composition, between about 16 and about 20. In certain embodiments, compositions of the present invention comprise materials of category P1-B-2 wherein n is, on average in the composition, between about 20 and about 40. In certain embodiments, compositions of the present invention comprise materials of category P1-B-2 wherein n is, on average in the composition, between about 30 and about 50.

In certain embodiments, compositions of the present invention comprise materials of category P1-B-2 wherein

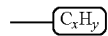

comprises a straight-chain aliphatic group. In certain embodiments, compositions of the present invention comprise materials of category P1-B-2 wherein

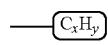

comprises a straight chain aliphatic group containing 6 to 80 carbon atoms.

In certain embodiments, compositions of the present invention comprise materials of category P1-B-2 wherein

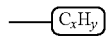

is selected from the group consisting of:
- a $C_{7-12}$ straight-chain aliphatic group;
- a $C_{12-16}$ straight-chain aliphatic group;
- a $C_{16-20}$ straight-chain aliphatic group;
- a $C_{24-28}$ straight-chain aliphatic group;
- a $C_{36-40}$ straight-chain aliphatic group;
- a $C_{40-60}$ straight-chain aliphatic group; and
- a $C_{60-80}$ straight-chain aliphatic group.

In certain embodiments, such straight-chain aliphatic groups are saturated, while in other embodiments, they contain one or more sites of unsaturation. In certain embodiments, such groups comprise or are derived from the chain of a naturally occurring material such as a long-chain fatty acid.

In certain embodiments, compositions of the present invention comprise materials of category P1-B-2 wherein the hydrocarbon moiety comprises the aliphatic chain of a fatty acid. In certain embodiments, compositions of the present invention comprise materials of category P1-B-2 wherein

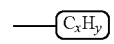

is selected from the group consisting of the compounds shown in Table 1. In certain embodiments, compositions of the present invention comprise materials of category P1-B-2 wherein

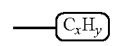

is selected from the group consisting of the compounds shown in Table 2.

Representative compositions of the present invention comprising materials of category P1-B-2 with straight chain aliphatic groups are shown in Table 5.

TABLE 5

| Designation | APC identity | n | —[$C_xH_y$] identity |
|---|---|---|---|
| P1-B-2a | | 4 | |
| P1-B-2b | | 4 | |
| P1-B-2c | | 4 | |
| P1-B-2d | | 4 | |
| P1-B-2e | | 4 | |
| P1-B-2f | | 4 | |
| P1-B-2g | | 4 | |

TABLE 5-continued
| Designation | APC identity | n | —$C_xH_y$ identity |
|---|---|---|---|
| P1-B-2h |  | 6 | 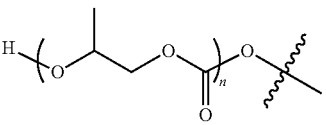 |
| P1-B-2i | 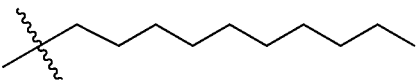 [SMILES: *CCCCCCCCCC] | 8 | 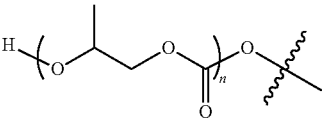 |
| P1-B-2j | 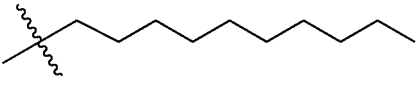 [SMILES: *CCCCCCCCCC] | 12 | 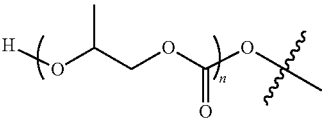 |
| P1-B-2k | 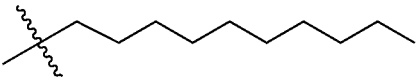 [SMILES: *CCCCCCCCCC] | 4 | 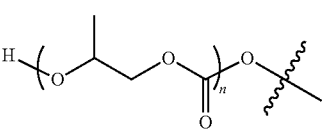 |
| P1-B-2l | 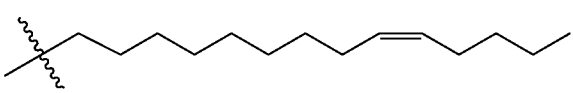 [SMILES: *CCCCCCCC/C=C\CCCC] | 4 | 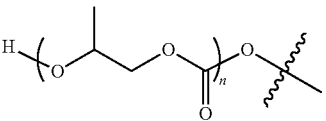 |
| P1-B-2m | 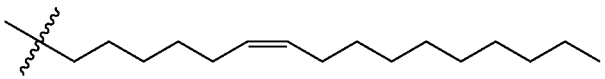 [SMILES: *CCCCC/C=C\CCCCCCCCC] | 4 | 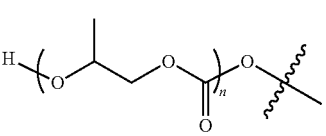 |
| P1-B-2n | 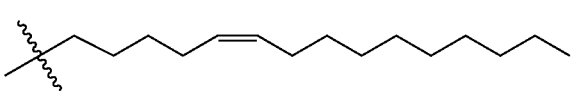 | 4 | 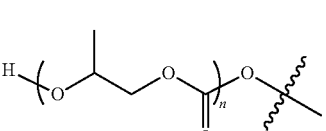 |
| P1-B-2o | 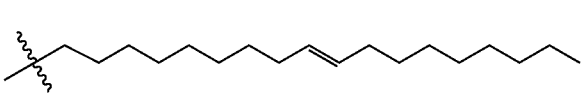 [SMILES: *CCCCCCCC/C=C/CCCCCCCC] | 8 | 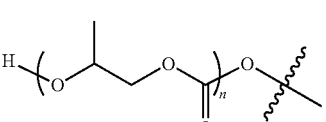 |
| P1-B-2p | 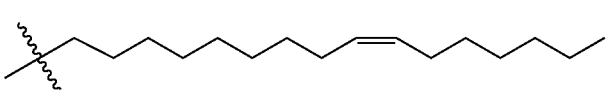 | 20 | 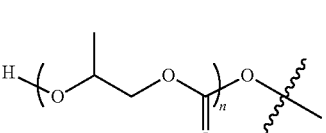 |
| P1-B-2q | 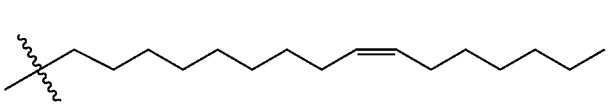 [SMILES: *CCCCCCCC/C=C\CCCCCC] | 6 | 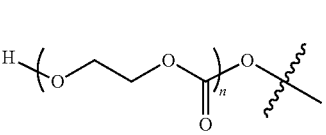 |

In certain embodiments, compositions of the present invention comprise materials of category P1-B-2 wherein

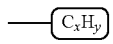

comprises a branched $C_{4-80}$ aliphatic group. In certain embodiments for compositions of type P1-B-2,

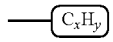

comprises a $C_{4-6}$ branched-chain aliphatic group. In certain embodiments for compositions of type P1-B-2,

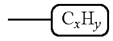

comprises a $C_{7-12}$ branched-chain aliphatic group; a $C_{12-16}$ branched-chain aliphatic group; a $C_{16-20}$ branched-chain aliphatic group; a $C_{20-24}$ branched-chain aliphatic group; a $C_{24-28}$ branched-chain aliphatic group; a $C_{28-36}$ branched-chain aliphatic group; or a $C_{36-40}$ branched-chain aliphatic group. In certain embodiments for compositions of type P1-B-2,

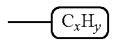

comprises a $C_{40-60}$ branched-chain aliphatic group or a $C_{60-80}$ branched-chain aliphatic group. In certain embodiments for compositions of type P1-B-2, branched-chain aliphatic groups are saturated, while in other embodiments, they contain one or more sites of unsaturation.

In certain embodiments, for compositions of type P1-B-2,

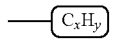

comprises a saturated aliphatic group with a branch present at the site of attachment of the

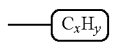

moiety to the aliphatic polycarbonate moiety. In certain other embodiments for compositions of type P1-B-2, the point of attachment of the

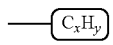

moiety to the aliphatic polycarbonate moiety is not a point of branching.

In certain embodiments, for compositions of type P1-B-2, the

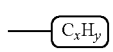

moiety is selected from the group consisting of:
- a $C_{3-40}$ straight carbon chain with one or more alkyl substituents;
- a $C_{4-40}$ straight carbon chain with 1-12 alkyl substituents;
- a $C_{4-40}$ straight carbon chain with 1-12 alkyl substituents where each alkyl substituent is independently a $C_{1-12}$ straight or branched alkyl;
- a $C_{4-20}$ straight carbon chain with 1-6 alkyl substituents, where each alkyl substituent is independently a $C_{1-6}$ straight or branched alkyl;
- a $C_{6-12}$ straight carbon chain with 1-4 alkyl substituents, where each alkyl substituent is independently a $C_{1-4}$ straight or branched alkyl; and
- a $C_{4-20}$ straight carbon chain with 1-6 alkyl substituents, where each alkyl substituent is independently a methyl or ethyl group.

In certain embodiments, for compositions of type P1-B-2, the

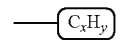

moiety is selected from the group consisting of: sec-butyl, 2-methylbutane, 3-methylbutane, 2-methylpentane, 3-methylpentane, 4-methylpentane, 2-methylhexane, 3-methylhexane, 4-methylhexane, 5-methylhexane, 2-methylheptane, 3-methylheptane, 4-methylheptane, 5-methylheptane, 6-methylheptane, 2-methyloctane, 3-methyloctane, 4-methyloctane, 5-methyloctane, 6-methyloctane, 7-methyloctane, 2-methylnonane, 3-methylnonane, 4-methylnonane, 5-methylnonane, 6-methylnonane, 7-methylnonane, 8-methylnonane, 2-methyldecane, 3-methyldecane, 4-methyldecane, 5-methyldecane, 6-methyldecane, 7-methyldecane, 8-methyldecane, 9-methyldecane, 2-methylundecane, 3-methylundecane, 4-methylundecane, 5-methylundecane, 6-methylundecane, 7-methylundecane, 8-methylundecane, 9-methylundecane, 10-methylundecane, 2-methyldodecane, 3-methyldodecane, 4-methyldodecane, 5-methyldodecane, 6-methyldodecane, 7-methyldodecane, 8-methyldodecane, 9-methyldodecane, 10-methyldodecane, 11-methyldodecane, 2-ethylbutane, 2-ethylpentane, 3-ethylpentane, 2-ethylhexane, 3-ethylhexane, 4-ethylhexane, 2-ethylheptane, 3-ethylheptane, 4-ethylheptane, 5-ethylheptane, 2-ethyloctane, 3-ethyloctane, 4-ethyloctane, 5-ethyloctane, 6-ethyloctane, 2-ethylnonane, 3-ethylnonane, 4-ethylnonane, 5-ethylnonane, 6-ethylnonane, 7-ethylnonane, 2-ethyldecane, 3-ethyldecane, 4-ethyldecane, 5-ethyldecane, 6-ethyldecane, 7-ethyldecane, 8-ethyldecane, 2-ethylundecane, 3-ethylundecane, 4-ethylundecane, 5-ethylundecane, 6-ethylundecane, 7-ethylundecane, 8-ethylundecane, 9-ethylundecane, 2-ethyldodecane, 3-ethyldodecane, 4-ethyldodecane, 5-ethyldodecane, 6-ethyldodecane, 7-ethyldodecane, 8-ethyldodecane, 9-ethyldodecane, 10-ethyldodecane, and combinations of any two or more of these.

In certain embodiments, compositions of type P1-B-2 comprise a

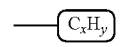

moiety selected from the group consisting of:
- a $C_5$ straight chain alkyl having two substituents independently selected from $C_{1-4}$ straight or branched alkyl;
- a $C_6$ straight chain alkyl having 2-3 substituents independently selected from $C_{1-4}$ straight or branched alkyl;

a $C_7$ straight chain alkyl having 2-3 substituents independently selected from $C_{1-4}$ straight or branched alkyl;
a $C_8$ straight chain alkyl having 2-4 substituents independently selected from $C_{1-4}$ straight or branched alkyl;
a $C_6$ straight chain alkyl having 2-4 substituents independently selected from $C_{1-4}$ straight or branched alkyl;
a $C_{10}$ straight chain alkyl having 2-4 substituents independently selected from $C_{1-4}$ straight or branched alkyl;
a $C_{11-12}$ straight chain alkyl having 2-4 substituents independently selected from $C_{1-4}$ straight or branched alkyl;
a $C_{12-16}$ straight chain alkyl having 2-5 substituents independently selected from $C_{1-4}$ straight or branched alkyl;
a $C_{16-20}$ straight chain alkyl having 2-6 substituents independently selected from $C_{1-4}$ straight or branched alkyl; and
a $C_{20-40}$ straight chain alkyl having 2-12 substituents independently selected from $C_{1-4}$ straight or branched alkyl.

In certain embodiments, for compositions of type P1-B-2, the

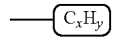

moiety comprises

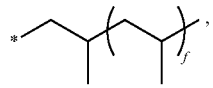

where * represents the site of attachment of the

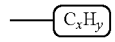

moiety to the polycarbonate moiety, and f is an integer from 1 to 12.

In certain embodiments, for compositions of type P1-B-2, a

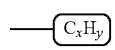

moiety is selected from the group consisting of:

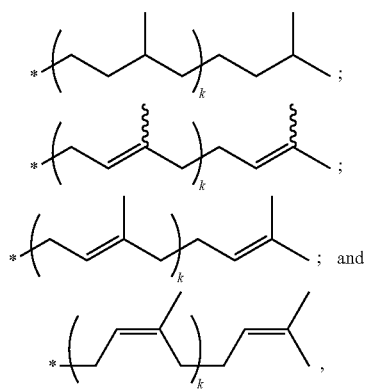

where k is an integer from 0 to 10.

In certain embodiments, for compositions of type P1-B-2, where

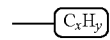

comprises an aliphatic group with a branch point at the site of attachment of the

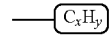

moiety to the aliphatic polycarbonate moiety, the

has a formula:

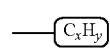

where $R^{a1}$ and $R^{a2}$ are each an aliphatic group.

In certain embodiments, for compositions of type P1-B-2, where

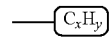

comprises

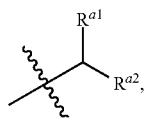

each of $R^{a1}$ and $R^{a2}$ comprises a straight chain aliphatic group. In certain embodiments each of $R^{a1}$ and $R^{a2}$ is independently selected from the group consisting of $C_{1-78}$ aliphatic groups where $R^{a1}$ and $R^{a2}$ together with the carbon atom to which they are attached contain at least 4 but less than 80 carbon atoms. In certain embodiments, $R^{a1}$ and $R^{a2}$ and the carbon atom to which they are attached comprise at least 6, at least 8, at least 10, at least 12, at least 16, at least 20, at least 24, at least 30, at least 34 or at least 38 carbon atoms. In certain embodiments, $R^{a1}$ and $R^{a2}$ and the carbon atom to which they are attached comprise between 6 and 10, between 8 and 12, between 12 and 16, between 16 and 20, between 20 and 24, between 24 and 30, between 30 and 40, between 40 and 60, or between 60 and 80 carbon atoms.

In certain embodiments,

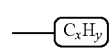

is selected from the group consisting of: 2-butane, 2-pentane, 3-pentane, 2-hexane, 3-hexane, 2-heptane, 3-heptane, 4-heptane, 2-octane, 3-octane, 4-octane, 2-nonane, 3-nonane, 4-nonane, 5-nonane, 2-decane, 3-decane, 4-decane, 5-decane, 2-undecane, 3-undecane, 4-undecane, 5-undecane, 6-undecane, 2-dodecane, 3-dodecane, 4-dodecane, 5-dodecane, 6-dodecane, and combinations of any two or more of these.

In certain embodiments, for compositions of type P1-B-2, where

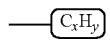

comprises

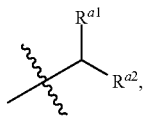

at least one of $R^{a1}$ and $R^{a2}$ comprises one or more branch points. In certain embodiments, one or more of $R^{a1}$ and $R^{a2}$ comprises an alkyl group bearing methyl or ethyl substituents. In certain embodiments, $R^{a1}$ and $R^{a2}$ are independently selected from the group consisting of: methyl, ethyl, propyl, butyl, n-pentane, n-hexane, n-heptane, n-octane, any $C_{9-40}$ n-alkyl, isopropyl, isobutyl, sec-butyl, 2-methylbutane, 3-methylbutane, 2-methylpentane, 3-methylpentane, 4-methylpentane, 2-methylhexane, 3-methylhexane, 4-methylhexane, 5-methylhexane, 2-methylheptane, 3-methylheptane, 4-methylheptane, 5-methylheptane, 6-methylheptane, 2-methyloctane, 3-methyloctane, 4-methyloctane, 5-methyloctane, 6-methyloctane, 7-methyloctane, 2-methylnonane, 3-methylnonane, 4-methylnonane, 5-methylnonane, 6-methylnonane, 7-methylnonane, 8-methylnonane, 2-methyldecane, 3-methyldecane, 4-methyldecane, 5-methyldecane, 6-methyldecane, 7-methyldecane, 8-methyldecane, 9-methyldecane, 2-methylundecane, 3-methylundecane, 4-methylundecane, 5-methylundecane, 6-methylundecane, 7-methylundecane, 8-methylundecane, 9-methylundecane, 10-methylundecane, 2-methyldodecane, 3-methyldodecane, 4-methyldodecane, 5-methyldodecane, 6-methyldodecane, 7-methyldodecane, 8-methyldodecane, 9-methyldodecane, 10-methyldodecane, 11-methyldodecane, 2-ethylbutane, 2-ethylpentane, 3-ethylpentane, 2-ethylhexane, 3-ethylhexane, 4-ethylhexane, 2-ethylheptane, 3-ethylheptane, 4-ethylheptane, 5-ethylheptane, 2-ethyloctane, 3-ethyloctane, 4-ethyloctane, 5-ethyloctane, 6-ethyloctane, 2-ethylnonane, 3-ethylnonane, 4-ethylnonane, 5-ethylnonane, 6-ethylnonane, 7-ethylnonane, 2-ethyldecane, 3-ethyldecane, 4-ethyldecane, 5-ethyldecane, 6-ethyldecane, 7-ethyldecane, 8-ethyldecane, 2-ethylundecane, 3-ethylundecane, 4-ethylundecane, 5-ethylundecane, 6-ethylundecane, 7-ethylundecane, 8-ethylundecane, 9-ethylundecane, 2-ethyldodecane, 3-ethyldodecane, 4-ethyldodecane, 5-ethyldodecane, 6-ethyldodecane, 7-ethyldodecane, 8-ethyldodecane, 9-ethyldodecane, 10-ethyldodecane, and combinations of any two or more of these.

In certain embodiments, for compositions of type P1-B-2, where

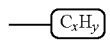

comprises

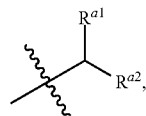

at least one of $R^{a1}$ and $R^{a2}$ is selected from the group consisting of: a $C_5$ straight chain alkyl having 1-2 substituents independently selected from $C_{1-4}$ straight or branched alkyl; a $C_6$ straight chain alkyl having 1-3 substituents independently selected from $C_{1-4}$ straight or branched alkyl; a $C_7$ straight chain alkyl having 1-3 substituents independently selected from $C_{1-4}$ straight or branched alkyl; a $C_8$ straight chain alkyl having 1-4 substituents independently selected from $C_{1-4}$ straight or branched alkyl; a $C_6$ straight chain alkyl having 1-4 substituents independently selected from $C_{1-4}$ straight or branched alkyl; a $C_{10}$ straight chain alkyl having 1-4 substituents independently selected from $C_{1-4}$ straight or branched alkyl; a $C_{11-12}$ straight chain alkyl having 1-4 substituents independently selected from $C_{1-4}$ straight or branched alkyl; a $C_{12-16}$ straight chain alkyl having 1-5 substituents independently selected from $C_{1-4}$ straight or branched alkyl; a $C_{16-20}$ straight chain alkyl having 1-6 substituents independently selected from $C_{1-4}$ straight or branched alkyl; and a $C_{20-40}$ straight chain alkyl having 1-12 substituents independently selected from $C_{1-4}$ straight or branched alkyl.

In certain embodiments, for compositions of type P1-B-2, where

comprises

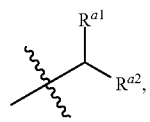

at least one of $R^{a1}$ and $R^{a2}$ comprises

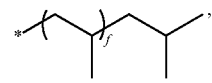

where * represents the site of attachment of the

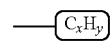

moiety to the polycarbonate moiety, and f is an integer from 1 to 12. In certain embodiments, at least one of $R^{a1}$ and $R^{a2}$ comprises is selected from the group consisting of:

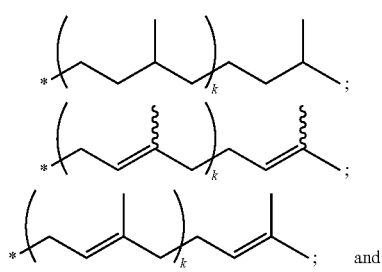
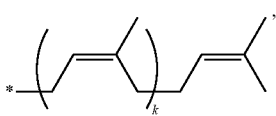
where k is an integer from 0 to 10.
Representative compositions of the present invention comprising materials of category P1-B-2 with straight chain aliphatic groups are shown in Table 6.
TABLE 6
| Designation | APC identity | n | $-C_xH_y$ identity |
|---|---|---|---|
| P1-B-2r |  | 4 |  |
| P1-B-2s |  | 4 |  |
| P1-B-2t |  | 4 |  |
| P1-B-2u |  | 4 |  |
| P1-B-2v |  | 4 |  |
| P1-B-2w |  | 4 |  |
| P1-B-2x |  | 4 |  |
| P1-B-2y |  | 8 |  |

TABLE 6-continued

| Designation | APC identity | n | —(C$_x$H$_y$) identity |
|---|---|---|---|
| P1-B-2z | H-(O-CH(CH₃)-CH₂-O-C(=O)-O)$_n$- | 12 | (branched hydrocarbon with two methyl branches) |
| P1-B-2aa | H-(O-CH(CH₃)-CH₂-O-C(=O)-O)$_n$- | 4 | (methyl-branched pentyl) |
| P1-B-2ab | H-(O-CH(CH₃)-CH₂-O-C(=O)-O)$_n$- | 4 | (2-ethylhexyl) |
| P1-B-2ac | H-(O-CH(CH₃)-CH₂-O-C(=O)-O)$_n$- | 4 | (gem-dimethyl branched alkyl) |
| P1-B-2ad | H-(O-CH(CH₃)-CH₂-O-C(=O)-O)$_n$- | 4 | (ethyl-branched alkyl) |
| P1-B-2ae | H-(O-CH(CH₃)-CH₂-O-C(=O)-O)$_n$- | 4 | (chiral branched alkenyl, citronellyl-like) |
| P1-B-2af | H-(O-CH(CH₃)-CH₂-O-C(=O)-O)$_n$- | 4 | (symmetrically branched alkyl) |
| P1-B-2ag | H-(O-CH(CH₃)-CH₂-O-C(=O)-O)$_n$- | 4 | (symmetrically branched long alkyl) |
| P1-B-2ah | H-(O-CH(CH₃)-CH₂-O-C(=O)-O)$_n$- | 4 | (symmetrically branched long alkyl) |

II. Methods of Making

In another aspect, the present invention encompasses methods of making the compositions described above.

One method for making compounds of the present invention involves copolymerizing one or more epoxides with $CO_2$ in the presence of a chain transfer agent, where the chain transfer agent is a hydrocarbon moiety having one functional group capable of acting as a polymerization initiator for epoxide $CO_2$ copolerization. In certain embodiments, such functional groups include an alcohol or carboxylic acid group (or a salt thereof). Suitable reaction conditions and catalysts for such reactions are disclosed in U.S. Pat. No. 8,247,520 the entirety of which is incorporated herein by reference.

One method for making compounds of the present invention involves copolymerizing one or more epoxides with $CO_2$ in the presence of a chain transfer agent, where the chain transfer agent is a hydrocarbon moiety having one functional group capable of acting as a polymerization initiator for epoxide $CO_2$ copolerization. In certain embodiments, such functional groups include an alcohol or carboxylic acid group (or a salt thereof).

In certain embodiments, methods of the present invention include the step of contacting a monofunctional alcohol or carboxylic acid of formula Z1

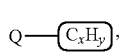
Z1 with one or more epoxides and carbon dioxide in the presence of a catalyst that promotes the copolymerization of epoxides and carbon dioxide to provide a product of formula I

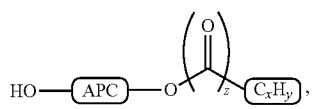
I wherein, Q comprises a functional group selected from —OH and —CO$_2$H; z is 0 or 1; and
each of

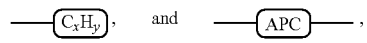

is as defined above and in the classes and subclasses herein.

Using Carboxylic Acid Starting Materials

In certain embodiments, methods of the present invention include the step of contacting a monofunctional carboxylic acid of formula Z1b

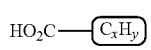
Z1b with one or more epoxides and carbon dioxide in the presence of a catalyst that promotes the copolymerization of epoxides and carbon dioxide to provide a product of formula P1

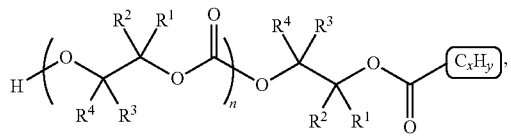
P1 where each of R$^1$, R$^2$, R$^3$, R$^4$,

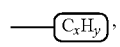

and n is as defined above and in the classes and subclasses herein.

In certain embodiments, the alcohol Z1b comprises a carboxylic acid-functionalized polyolefin or a salt thereof. In certain embodiments, Z1a comprises a carboxylic acid-functionalized polyethylene. In certain embodiments, Z1a comprises a carboxylic acid-functionalized polypropylene.

In certain embodiments, for the method above, Z1b comprises a C$_{4-80}$ aliphatic carboxylic acid (or a salt thereof).

In certain embodiments, the alcohol Z1b comprises a straight-chain carboxylic acid. In certain embodiments, such carboxylic acids comprise 6 to 80 carbon atoms. In certain embodiments, Z1b comprises a C$_{7-12}$ straight-chain carboxylic acid. In certain embodiments, Z1b comprises a C$_{12-16}$ straight-chain carboxylic acid. In certain embodiments, Z1b comprises a C$_{16-20}$ straight-chain carboxylic acid. In certain embodiments, Z1b comprises a C$_{20-24}$ straight-chain carboxylic acid, a C$_{24-28}$ straight-chain carboxylic acid, a C$_{28-36}$ straight-chain carboxylic acid, or a C$_{36-40}$ straight-chain carboxylic acid. In certain embodiments, Z1b comprises a C$_{40-60}$ straight-chain carboxylic acid or a C$_{60-80}$ straight-chain carboxylic acid. In certain embodiments, such straight-chain carboxylic acid are saturated, while in other embodiments, they contain one or more sites of unsaturation. In certain embodiments, Z1b comprises or is derived from a naturally occurring material such as a long-chain fatty acid.

In embodiments where Z1b comprises a saturated straight aliphatic carboxylic acid, suitable chains include, but are not limited to those derived from common fatty acids. In certain embodiments Z1b is selected from Table 7:

TABLE 7

| Examples of Saturated Fatty acids | |
|---|---|
| Common name of fatty acid | Structure |
| Caprylic acid | CH$_3$(CH$_2$)$_6$—CO$_2$H |
| Capric acid | CH$_3$(CH$_2$)$_8$—CO$_2$H |
| Lauric acid | CH$_3$(CH$_2$)$_{10}$—CO$_2$H |
| Myristic acid | CH$_3$(CH$_2$)$_{12}$—CO$_2$H |
| Palmitic acid | CH$_3$(CH$_2$)$_{14}$—CO$_2$H |
| Stearic acid | CH$_3$(CH$_2$)$_{16}$—CO$_2$H |
| Rachidic acid | CH$_3$(CH$_2$)$_{18}$—CO$_2$H |
| Behenic acid | CH$_3$(CH$_2$)$_{20}$—CO$_2$H |
| Lignoceric acid | CH$_3$(CH$_2$)$_{22}$—CO$_2$H |
| Cerotic acid | CH$_3$(CH$_2$)$_{24}$—CO$_2$H |

In embodiments where Z1b comprises an unsaturated straight aliphatic carboxylic acid, suitable carboxylic acids include, but are not limited to common naturally-occurring unsaturated fatty acids. In certain embodiments, suitable carboxylic acids include, but are not limited to those shown in Table 8:

TABLE 8

Examples of Unsaturated Fatty Acids

| Common name of fatty acid | Corresponding Aliphatic Carboxylic acid | $\Delta^x$ |
|---|---|---|
| Myristoleic | $CH_3(CH_2)_3CH=CH(CH_2)_7-CO_2H$ | cis-$\Delta^9$ |
| Palmitoleic | $CH_3(CH_2)_5CH=CH(CH_2)_7-CO_2H$ | cis-$\Delta^9$ |
| Sapienic | $CH_3(CH_2)_8CH=CH(CH_2)_4-CO_2H$ | cis-$\Delta^6$ |
| Oleic | $CH3(CH_2)_7CH=CH(CH_2)_7-CO_2H$ | cis-$\Delta^9$ |
| Elaidic | $CH_3(CH_2)_7CH=CH(CH_2)_7-CO_2H$ | trans-$\Delta^9$ |
| Vaccenic | $CH_3(CH_2)_5CH=CH(CH_2)_9-CO_2H$ | trans-$\Delta^{11}$ |
| Linoleic | $CH_3(CH_2)_4CH=CHCH_2CH=CH(CH_2-)CO_2H$ | cis,cis-$\Delta^9,\Delta^{12}$ |
| Linoelaidic | $CH_3(CH_2)_4CH=CHCH_2CH=CH(CH_2)_7-CO_2H$ | trans,trans-$\Delta^9,\Delta^{12}$ |
| α-Linolenic | $CH_3CH_2CH=CHCH_2CH=CHCH_2CH=CH(CH_2)_7-CO_2H$ | cis,cis,cis-$\Delta^9,\Delta^{12},\Delta^{15}$ |
| Arachidonic | $CH_3(CH_2)_4CH=CHCH_2CH=CHCH_2CH=CHCH_2CH=CH(CH_2)_3-CO_2H$ | cis,cis,cis,cis-$\Delta^5,\Delta^8,\Delta^{11},\Delta^{14}$ |
| Eicosapentaenoic | $CH_3CH_2CH=CHCH_2CH=CHCH_2CH=CHCH_2CH=CHCH_2CH=CH(CH_2)_3-CO_2H$ | cis,cis,cis,cis,cis-$\Delta^5,\Delta^8,\Delta^{11},\Delta^{14},\Delta^{17}$ |
| Erucic | $CH_3(CH_2)_7CH=CH(CH_2)_{11}-CO_2H$ | cis-$\Delta^{13}$ |
| Docosahexaenoic | $CH_3CH_2CH=CHCH_2CH=CHCH_2CH=CHCH_2CH=CHCH_2CH=CHCH_2CH=CH(CH_2)_2-CO_2H$ | cis,cis,cis,cis,cis,cis-$\Delta^4,\Delta^7,\Delta^{10},\Delta^{13},\Delta^{17},\Delta^{16},\Delta^{19}$ |

In certain embodiments, Z1b comprises a branched aliphatic carboxylic acid. In certain embodiments, such carboxylic acids comprise from 4 to about 80 carbon atoms. In certain embodiments, Z1b comprises a $C_{4-6}$ branched-chain carboxylic acid. In certain embodiments, Z1b comprises a $C_{7-12}$ branched-chain carboxylic acid. In certain embodiments, Z1b comprises a $C_{12-16}$ branched-chain carboxylic acid. In certain embodiments, Z1b comprises a $C_{16-20}$ branched-chain carboxylic acid. In certain embodiments, Z1b comprises a $C_{20-24}$ branched-chain carboxylic acid, a $C_{24-28}$ branched-chain carboxylic acid, a $C_{28-36}$ branched-chain carboxylic acid, or a $C_{36-40}$ branched-chain carboxylic acid. In certain embodiments, Z1b comprises a $C_{40-60}$ branched-chain carboxylic acid or a $C_{60-80}$ branched-chain carboxylic acid. In certain embodiments, such branched-chain carboxylic acids are saturated, while in other embodiments, they contain one or more sites of unsaturation.

In certain embodiments, Z1b comprises a carboxylic acid having a $C_{3-40}$ straight carbon chain. In certain embodiments, the carbon chain of the carboxylic acid Z1b also contains one or more alkyl substituents. In certain embodiments, Z1b comprises a $C_{4-40}$ straight carbon chain with 1-12 alkyl substituents. In certain embodiments, Z1b comprises a $C_{4-40}$ straight carbon chain with 1-12 alkyl substituents, where each alkyl substituent is independently a $C_{1-12}$ straight or branched alkyl. In certain embodiments, Z1b comprises a $C_{4-20}$ straight carbon chain with 1-6 alkyl substituents, where each alkyl substituent is independently a $C_{1-6}$ straight or branched alkyl. In certain embodiments, Z1b comprises a $C_{6-12}$ straight carbon chain with 1-4 alkyl substituents, where each alkyl substituent is independently a $C_{1-4}$ straight or branched alkyl. In certain embodiments, Z1b comprises a $C_{4-20}$ straight carbon chain with 1-6 alkyl substituents, where each alkyl substituent is independently a methyl or ethyl group.

In certain embodiments, Z1b comprises a carboxylic acid selected from the group consisting of: sec-butanoic, 2-methylbutanoic acid, 3-methylbutanoic acid, 2-methylpentanoic acid, 3-methylpentanoic acid, 4-methylpentanoic acid, 2-methylhexanoic acid, 3-methylhexanoic acid, 4-methylhexanoic acid, 5-methylhexanoic acid, 2-methylheptanoic acid, 3-methylheptanoic acid, 4-methylheptanoic acid, 5-methylheptanoic acid, 6-methylheptanoic acid, 2-methyloctanoic acid, 3-methyloctanoic acid, 4-methyloctanoic acid, 5-methyloctanoic acid, 6-methyloctanoic acid, 7-methyloctanoic acid, 2-methylnonanoic acid, 3-methylnonanoic acid, 4-methylnonanoic acid, 5-methylnonanoic acid, 6-methylnonanoic acid, 7-methylnonanoic acid, 8-methylnonanoic acid, 2-methyldecanoic acid, 3-methyldecanoic acid, 4-methyldecanoic acid, 5-methyldecanoic acid, 6-methyldecanoic acid, 7-methyldecanoic acid, 8-methyldecanoic acid, 9-methyldecanoic acid, 2-methylundecanoic acid, 3-methylundecanoic acid, 4-methylundecanoic acid, 5-methylundecanoic acid, 6-methylundecanoic acid, 7-methylundecanoic acid, 8-methylundecanoic acid, 9-methylundecanoic acid, 10-methylundecanoic acid, 2-methyldodecanoic acid, 3-methyldodecanoic acid, 4-methyldodecanoic acid, 5-methyldodecanoic acid, 6-methyldodecanoic acid, 7-methyldodecanoic acid, 8-methyldodecanoic acid, 9-methyldodecanoic acid, 10-methyldodecanoic acid, 11-methyldodecanoic acid, 2-ethylbutanoic acid, 2-ethylpentanoic acid, 3-ethylpentanoic acid, 2-ethylhexanoic acid, 3-ethylhexanoic acid, 4-ethylhexanoic acid, 2-ethylheptanoic acid, 3-ethylheptanoic acid, 4-ethylheptanoic acid, 5-ethylheptanoic acid, 2-ethyloctanoic acid, 3-ethyloctanoic acid, 4-ethyloctanoic acid, 5-ethyloctanoic acid, 6-ethyloctanoic acid, 2-ethylnonanoic acid, 3-ethylnonanoic acid, 4-ethylnonanoic acid, 5-ethylnonanoic acid, 6-ethylnonanoic acid, 7-ethylnonanoic acid, 2-ethyldecanoic acid, 3-ethyldecanoic acid, 4-ethyldecanoic acid, 5-ethyldecanoic acid, 6-ethyldecanoic acid, 7-ethyldecanoic acid, 8-ethyldecanoic acid, 2-ethylundecanoic acid, 3-ethylundecanoic acid, 4-ethylundecanoic acid, 5-ethylundecanoic acid, 6-ethylundecanoic acid, 7-ethylundecanoic acid, 8-ethylundecanoic acid, 9-ethylundecanoic acid, 2-ethyldodecanoic acid, 3-ethyldodecanoic acid, 4-ethyldodecanoic acid, 5-ethyldodecanoic acid, 6-ethyldodecanoic acid, 7-ethyldodecanoic acid, 8-ethyldodecanoic acid, 9-ethyldodecanoic acid, 10-ethyldodecanoic acid, and combinations of any two or more of these.

For avoidance of doubt with respect to interpretation of these methods, where Z1b is chosen from the group above to be 5-methylheptanoic acid, the compound of formula P1 thereby produced will have a structure:

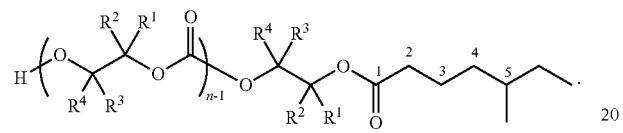

In certain embodiments, Z1b comprises a saturated carboxylic acid with multiple branches. In certain embodiments, Z1b comprises a carboxylic acid selected from the group consisting of: a $C_5$ straight chain alkanoic acid having two substituents independently selected from $C_{1-4}$ straight or branched alkyl; a $C_6$ straight chain alkanoic acid having 2-3 substituents independently selected from $C_{1-4}$ straight or branched alkyl; a $C_7$ straight chain alkanoic acid having 2-3 substituents independently selected from $C_{1-4}$ straight or branched alkyl; a $C_8$ straight chain alkanoic acid having 2-4 substituents independently selected from $C_{1-4}$ straight or branched alkyl; a $C_9$ straight chain alkanoic acid having 2-4 substituents independently selected from $C_{1-4}$ straight or branched alkyl; a $C_{10}$ straight chain alkanoic acid having 2-4 substituents independently selected from $C_{1-4}$ straight or branched alkyl; a $C_{11-12}$ straight chain alkanoic acid having 2-4 substituents independently selected from $C_{1-4}$ straight or branched alkyl; a $C_{12-16}$ straight chain alkanoic acid having 2-5 substituents independently selected from $C_{1-4}$ straight or branched alkyl; a $C_{16-20}$ straight chain alkanoic acid having 2-6 substituents independently selected from $C_{1-4}$ straight or branched alkyl; and a $C_{20-40}$ straight chain alkanoic acid having 2-12 substituents independently selected from $C_{1-4}$ straight or branched alkyl.

In certain embodiments, Z1b comprises

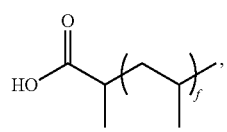

where f is an integer from 1 to 12.

In certain embodiments, Z1b comprises a branched fatty acid. In certain embodiments, such branched fatty acids include naturally occurring materials such as methyl branched fatty acids, iso-methyl branched fatty acids (which have the branch point on the penultimate carbon), anteiso-methyl-branched fatty acids (which have the branch point on the ante-penultimate carbon atom (two from the end), isoprenoid fatty acids, and other similar materials.

In certain embodiments, Z1b comprises an isoprenoid fatty acid. In certain embodiments, Z1b is selected from the group consisting of:

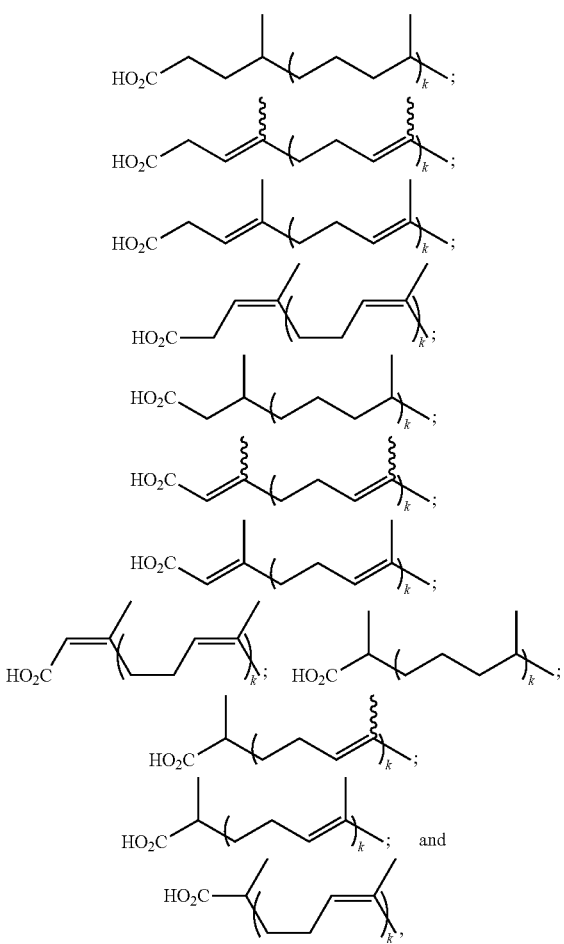

where k is an integer from 0 to 10.

In certain embodiments, for any of the methods above, the epoxide has a formula:

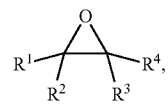

where each of $R^1$, $R^2$, $R^3$, and $R^4$, is as defined above and in the classes and subclasses herein.

In certain embodiments, for any of the methods above, the epoxide is selected from the group consisting of: ethylene oxide, propylene oxide, 1,2 butene oxide, 1,2 hexene oxide, oxides of higher alpha olefins (e.g. $C_{6-40}$ alpha olefins), butadiene monoepoxide, epichlorohydrin, ethers or esters of glycidol, cyclopentene oxide, cyclohexene oxide, 3 vinyl cyclohexene oxide, and 3-ethyl cyclohexene oxide, or with combinations of any two or more of these.

In certain embodiments, for any of the methods above, the epoxide comprises ethylene oxide. In certain embodiments, for any of the methods above, the epoxide comprises propylene oxide. In certain embodiments, for any of the methods above, the epoxide comprises cyclohexene oxide.

In certain embodiments, the methods above include the step of allowing the copolymerization to proceed until a desired chain length of epoxide-$CO_2$ copolymer has been formed. In certain embodiments, the method includes a further step of terminating the polymerization reaction and isolating the product.

III. Applications

In another aspect, the present invention includes methods of using the block copolymeric materials described above. The inventive materials are suitable for a range of applications. As noted above, one application is as effective compatibilizers for polymer blends. However, the new block materials are contemplated to have numerous other applications. Many of the inventive materials provided are amphiphilic and therefore suggest themselves for applications where there is a desire to compatibilize or solubilize dissimilar materials. In addition to compatibilizing polymer blends the materials may have applications as emulsifiers for liquids or gels, as detergents or surfactants, viscosity or lubricity modifiers, plasticizers, fuel additives, in tie-layer and adhesive applications and in a host of related uses which will be apparent to the skilled artisan.

In certain embodiments, the present invention provides materials useful for forming blends of a polyolefin with a relatively polar polymer such as a polycarbonate, a polyester, or a polyether. In particular, the inventive materials described above have application for making thermoplastic blends comprising a polyolefin (such as polyethylene or polyprpopylene) and an aliphatic polycarbonate (such as poly(propylene carbonate), poly(ethylene carbonate), and poly(cyclohexene carbonate).

Other Embodiments

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of compatibilizing a blend of two or more polymers comprising the step of admixing with the polymers an effective amount of the block copolymer comprising the formula:

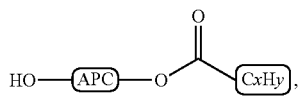

where the moiety

comprises an alternating copolymer of $CO_2$ and one or more epoxides; and
the moiety

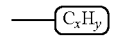

consisting of a saturated or unsaturated hydrocarbon.

2. The method of claim 1, wherein the blend of two or more polymers comprises at least one polyolefin and at least one aliphatic polycarbonate.

3. The method of claim 2, wherein a polyolefin is selected from polyethylene and polypropylene.

4. The method of claim 2, wherein the aliphatic polycarbonate is selected from poly(propylene carbonate); poly(ethylene carbonate); poly(cyclohexene carbonate); and blends or copolymers of two or more of the aliphatic polycarbonate.

* * * * *